United States Patent
Suzuki et al.

(10) Patent No.: US 7,065,099 B1
(45) Date of Patent: Jun. 20, 2006

(54) DIGITAL CIRCUIT MULTIPLICATION EQUIPMENT

(75) Inventors: Shigeaki Suzuki, Tokyo (JP); Wataru Fushimi, Tokyo (JP); Hisashi Yajima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 856 days.

(21) Appl. No.: 09/664,096

(22) Filed: Sep. 19, 2000

(30) Foreign Application Priority Data

Feb. 8, 2000 (JP) ............................. 2000-030791

(51) Int. Cl.
*H04J 3/16* (2006.01)

(52) U.S. Cl. ...................... 370/465; 370/535; 370/540

(58) Field of Classification Search ................ 370/465, 370/535, 537, 540; 704/208, 210, 212, 215
See application file for complete search history.

(56) References Cited

U.S. PATENT DOCUMENTS

| | | | |
|---|---|---|---|
| 4,924,480 A * | 5/1990 | Gay et al. .................... 375/222 |
| 5,257,262 A | 10/1993 | Shioka et al. | |
| 5,410,754 A * | 4/1995 | Klotzbach et al. ........... 370/466 |
| 5,436,899 A * | 7/1995 | Fujino et al. ................ 370/433 |
| 5,493,610 A * | 2/1996 | Suzuki et al. ........... 379/100.17 |
| 5,712,915 A * | 1/1998 | Onufry, Jr. .................. 380/270 |
| 5,857,009 A * | 1/1999 | Handig ..................... 379/32.01 |
| 5,926,477 A | 7/1999 | Shirokura et al. | |
| 6,029,127 A * | 2/2000 | Delargy et al. ............. 704/215 |
| 6,172,978 B1 | 1/2001 | Fushimi et al. | |
| 6,320,876 B1 * | 11/2001 | Virdee et al. ................ 370/468 |
| 6,510,219 B1 * | 1/2003 | Wellard et al. ......... 379/221.01 |
| 6,570,869 B1 * | 5/2003 | Shankar et al. ............. 370/352 |
| 6,657,996 B1 * | 12/2003 | Mladenovic et al. ....... 370/356 |

* cited by examiner

*Primary Examiner*—Chau Nguyen
*Assistant Examiner*—Ian N. Moore
(74) *Attorney, Agent, or Firm*—Birhch, Stewart, Kolasch & Birch, LLP

(57) ABSTRACT

In a digital circuit multiplication equipment (DCME) equipped with tandem pass-through function, a speech coding device and a speech decoding device are resettable in a synchronous resetting mode. The DCME includes a transmission device and a unit to continuously assign and transmit data from a trunk channel to another DCME via a bearer circuit and an exchange during pass-through operation.

9 Claims, 20 Drawing Sheets

CONVENTIONAL ART

DIGITAL CIRCUIT MULTIPLICATION EQUIPMENT

BACKGROUND OF THE INVENTION

1. Field of the Invention

The present invention generally relates to a digital circuit multiplication equipment. More specifically, the present invention is directed to a digital circuit multiplication equipment equipped with a tandem pass-through function capable of pass-through-transmitting speech/data signals in a trunk channel connected via a exchange without performing low-bit-rate speech encoding/decoding operations.

2. Description of the Related Art

In long distance telephone communications such as international telephone communications, digital circuit multiplication equipments (DCMEs) have been conducted in order to reduce communication cost. A DCME implies such an apparatus capable of transmitting telephone speech signals and voice band data signals such as facsimile signals and data/modem signals in a higher efficiency by combining a DSI (digital speech interpolation) technique and a low-bit-rate speech encoding technique. This DSI technique corresponds to such a technique capable of transmitting only active portions of telephone communications.

FIG. 16 is a block diagram for schematically representing an entire arrangement of a DCME.

In FIG. 16, there are provided a active judging unit 1, a signal discriminating unit 2, a speech (audio) encoding unit 3, an assignment control unit 4, a message producing unit 5, a multiplexing unit 6, a separating unit 7, a message decrypting unit 8, and a speech decoding unit 9. A left side of this drawing corresponds to a trunk side through which plural channels of telephone speech/voice band data in the 64 Kbit/s PCM (Pulse Code Modulation) format are inputted/outputted. Also, a right side of this drawing corresponds to a bearer side (transmit path side) through which telephone speech/voice band data which have been encoded in low bit rates (will be referred to as "encoded speech signals" hereinafter) are transmitted/received.

For the sake of easy understandings, it is now assumed that while this DCME owns as the trunk side a capacity capable of inputting/outputting 600 channels of 64 Kbit/s-telephone speech/voice band data signals, this DCME owns as the bearer side a line capacity of 2 Mbit/s. Also, the following assumption is made in the below-mentioned description:

As a encoding rate for a low-bit-rate speech encoding operation, a encoding rate of 8 Kbit/s is used so as to transmit a telephone speech signal, whereas another encoding rate of 40 Kbit/s is employed in order to transmit a voice band data signal.

Next, a description will now be made of operations of the DCME equipped with the arrangement shown in FIG. 16.

The 64 Kbit/s PCM-formatted signals for 600 channels, which are entered from the trunk side of this DCME, are inputted into the active judging unit 1, the signal discriminating unit 2, and the speech encoding unit 3, respectively. The active judging unit 1 judges as to whether each of these 600 channels owns an active signal, or a silent signal, and then outputs a judgement result to the assignment control unit 4. The signal discriminating unit 2 judges as to whether an input signal of each trunk channel is equal to a telephone speech (voice) signal, or a data signal such as a facsimile signal, and then outputs this judgement result to the assignment control unit 4.

Based upon both the active/silence judgement result of each of the trunk channels derived from the active judging unit 1 and also the speech/data discrimination result of each of the trunk channels derived from the signal discriminating unit 2, the assignment control unit 4 determines an assignment rate of each trunk channel to the bearer circuit, and then outputs the determined assignment result to both the message producing unit 5 and the multiplexing unit 6.

As this bearer circuit assignment method, while trunk channels having active signals are assigned to bearer circuits while priority rights are given to these trunk channels, the encoding rate of 40 Kbit/s per one channel is assigned to such a trunk channel which is judged as a data channel, and further the encoding rate of 8 Kbit/s per one channel is assigned to such a trunk channel which is judged as a speech channel. The reason why the encoding rate is changed in accordance with a sort of input signal is given as follows: That is, the information amount compression principle of the low-bit-rate speech encoding operation is to reduce redundancy owned by a speech signal, while utilizing redundancy owned by the speech signal. Although the high compression rate can be obtained with respect to the speech signal, the high compression rate cannot be obtained with respect to the voice band data signal such as the facsimile signal.

The encoding rate of each of the trunk channels, which is determined by this assignment control unit 4, is outputted to the speech encoding unit 3, the speech encoding unit 3 is equipped with speech decoding devices for 600 channels. In response to the encoding rate information supplied from the assignment control unit 4, the speech encoding unit 3 encodes the input signals entered from the respective trunk channels by 8 Kbit/s encoding rate when these input signals are the telephone speech signals, and encodes the input signals entered from the respective trunk channels by 40 Kbit/s encoding rate when these input signals are the voice band data signals. Then, the speech encoding unit 3 outputs the encoded signals to the multiplexing unit 6.

It should be noted that the assignment/no-assignment information (namely, information as to whether or not each channel is assigned to a bearer circuit) for the respective channels is also entered from the assignment control unit 4 into the speech encoding unit 3, the reason of which is given as follows:

Normally, both a speech coding device and a speech decoding device are equipped with prediction filters for predicting spectrum information of an input speech signal. The parameter of the prediction filter provided in the speech decoding device which constitutes the transmission side must be made coincident with the parameter of the prediction filter provided in the speech decoding device which constitutes the receiving side. In the case that this prediction filter is such a type of algorithm for updating the past parameter based upon a newly inputted speech signal, in order to make the parameter of the encoding device coincident with the parameter of the decoding device, when the encoding device is connected to the decoding device (namely, when a bearer circuit is newly assigned), both of these encoding/decoding devices are required to be operated from such a condition that these parameters thereof are initialized (reset). This operation is referred to as "a synchronous reset" executed between the speech coding device and the speech decoding device.

As a result, the speech encoding unit 3 may realize this synchronous reset in such a manner that this speech encoding unit 3 initializes the above-explained parameters with respect to the trunk channel operated under such a condition that the bearer has been assigned based upon the assignment/ no-assignment information of the bearer circuit, which is changed from another trunk channel condition where the bearer circuit is not assigned. Also, in the speech decoding device, when input operation of the encoded signal from the bearer circuit is commenced, the speech decoding device initializes the parameter thereof.

The message producing unit 5 produces an assignment message to be transmitted to an apparatus on the opposite side on the bearer, based on an assignment result entered from the assignment control unit 4.

In this case, in order to explain the assignment message, FIG. 17 shows a structural example of a frame of a signal (DCME frame) which is outputted by the DCME to the bearer circuit.

In this example, there are 248 channels of bearer channels (BC) and a message channel. The speech encoded data is transmitted via the bearer channels on the bearer circuit. The assignment message is transmitted via the message channel on the bearer circuit. Each of the BC channels owns a capacity of 8 Kbit/s, and therefore, can transmit speech encoded data of 8 Kbit/s corresponding to 248 channels at maximum. Also, the speech encoded data of 40 Kbit/s are transmitted by using 5 channels of the BC channels.

Normally, the length of this DCME frame is selected to be longer than the 8 Kbit/s speech encoding frame length and the 40 Kbit/s speech encoding frame length by an integer multiplication. For example, in the case that the 8 Kbit/s speech encoding frame length is equal to 10 ms and the 40 Kbit/s speech encoding frame length is equal to 2.5 ms, the DCME frame length may be selected to be 10 ms. Subsequently, in this specification, assuming that this length of the DCME frame is equal to 10 ms, the explanation is made (bit number of each BC is equal to 10 ms×8000=0.01 s×8000=80 bits).

Also, 4 sets of messages are transmitted through the message channel. A pair of a trunk channel number (TC number) and a bearer channel number (BC number) may constitute 1 message. For instance, when the number 5 of trunk channel is newly connected to the number 3 of bearer channel, such a message of TC number=5 and BC number=3 is transmitted by employing one message. Normally in the case that TC number=0 indicates "remove", for example, when the trunk channel connected to BC50 is removed, such a message of TC number=0 and BC number=50 is transmitted.

As previously explained, the assignment message is used to notify such assignment message to the apparatus on the opposite side of the bearer, namely how each of the trunk channels is assigned to the bearer circuit. In order to save the capacity of the message channel, only changing information about the assignment condition is notified as this assignment message. As a consequence, in such a case that there are large change amounts, for example, in the case that a large number of trunk channels are transmitted from silent states to active states at the same time, there is a certain possibility that some channels would wait for assignments to bearer circuits.

Based on the assignment result to the bearer circuit obtained from the assignment control unit 4, the multiplexing unit 6 multiplexes the encoded signals of the respective trunk channels derived from the speech encoding unit 3 to output the multiplexed encoded signal to the bearer circuit. Also, this multiplexing unit 6 multiplexes the assignment messages entered from the message producing unit 5 to output the multiplexed assignment message to the bearer circuit.

Subsequently, a description will now be made of operations of the DCME on the receiving side.

The separating unit 7 inputs thereinto both the encoded signal derived from the bearer circuit and the signal on which the assignment message is multiplexed, and then outputs the assignment message to the message decrypting unit 8 and further outputs the encoded signal to the speech decoding unit 9. It should be noted that when the separating unit 7 separates the encoded signal, the decrypt result of the assignment message is entered from the message decrypting unit 8 so as to separate this encoded signal based upon this decrypt result.

The message decrypting unit 8 inputs the assignment message from the separating unit 7, and then outputs the message decrypt result to the separating unit 7 and at the same time outputs both the assignment/no-assignment information and the encoding rate information of each of the trunk channels to the speech decoding unit 9. The speech decoding unit 9 decodes the encoded signal entered from the separating unit 7 based on the information entered from the message decrypting unit 8 to thereby produce a PCM signal, and then outputs this PCM signal to the respective channels provided on the trunk side.

As previously explained, the DCME encodes the 64 Kbit/s PCM signals supplied from the respective trunk channels by way of the low-bit-rate encoding manner to obtain either the 8 Kbit/s PCM signal or the 40 Kbit/s PCM signal. Furthermore, the DCME transmits such a PCM signal with a top priority, which is judged as a "active" PCM signal. As a consequence, this DCME can transmit the telephone speech signal and the facsimile signal in a low-bit-rate.

On the other hand, the following case will now be considered. As shown in FIG. 18, such DCMEs are arranged at, for example, 3 points, and thus, a network structure is constituted.

Assuming now that the DCMEs are used in the international telephone communication, these points "A", "B", and "C" correspond to, for example, communication points in the respective countries such as Japan, USA, and UK. In this network system of FIG. 18, when a telephone communication is established between a telephone set 110 and a telephone set 111, a telephone communication signal produced from the telephone set 110 is low-bit-rate encoded by the DCME 100, and thereafter, this encoded telephone communication signal is decoded by the DCME 101 to produce a PCM signal. This PCM signal is transmitted via a exchange 106 to the DCME 102. In this DCME 102, this PCM signal is again low-bit-rate encoded in a low-bit-rate and then the encoded PCM signal is transmitted to the DCME 103. In this DCME 103, this low-bit-rate encoded signal is decoded to obtain a PCM signal which will then be supplied to the telephone set 111.

As previously explained, when the DCMEs are used in such a network structure as shown in FIG. 18, both the low-bit-rate encoding operation and the decoding operation are repeated two times, resulting in degradation of the telephone communication quality.

To avoid such a problem, such a technique called as "tandem pass-through" has been practically used in the voice ATM communication field and the like.

FIG. 19 is a structural diagram for indicating the voice ATM transmission apparatus 60 equipped with the tandem pass-through function disclosed in Japanese Laid-open Patent Application No. Hei-10-190667.

In FIG. 19, reference numeral 10 shows a cell disassembling unit for disassembling an ATM cell entered from a bearer circuit side to output the disassembled ATM cell, reference numeral 9 represents a speech decoding unit for decoding a encoded signal to output a PCM signal, reference numeral 3 indicates a speech encoding unit for encoding the PCM signal inputted from the trunk side to output a encoded signal, and reference numeral 11 shows a cell assembling unit for assembling the entered encoded signals to output an ATM cell. Also, reference numeral 12 is a pseudo speech signal producing unit for converting either the 8 Kbit/s encoded signal or the 40 Kbit/s encoded signal into such a 64 Kbit/s signal which can be handled by the exchange without executing the decoding operation to output a pseudo speech signal (for example, in case of 8 Kbit/s encoded signal, dummy data of 56 Kbit/s is added to this encoded signal so as to produce pseudo signal of 64 Kbit/s), and reference numeral 13 shows a transmission rate recovering unit for deleting the dummy data of 56 Kbit/s from the pseudo speech signal inputted from the exchange side to convert this pseudo speech signal into the encoded signal having the original encoding rate.

Also, reference numeral 14 indicates a second comfort noise generating unit for generating comfort noise equivalent to background noise during telephone conversation, reference numeral 15 shows a first comfort noise generating unit for generating comfort noise equivalent to background noise during telephone conversation, reference numeral 16 is a first pattern interpolating unit for interpolating a second pattern signal used to cause a voice ATM transmission apparatus as a counter-party apparatus during relay operation to recognize a relay connection, reference numeral 17 is a second pattern interpolating unit for interpolating a first pattern signal used to cause a voice ATM transmission apparatus as a counter-party apparatus during relay operation to recognize such a fact that the own voice ATM transmission apparatus detects the first pattern signal to be brought into relay/switch condition, reference numeral 18 is a first pattern detecting unit for detecting the first pattern signal supplied from the voice ATM transmission apparatus as the counter-party apparatus during relay operation, and also, reference numeral 19 is a second pattern detecting unit for detecting the second pattern signal supplied from the voice ATM transmission apparatus as the counter-party apparatus during relay operation.

Furthermore, reference numeral 20 shows a selector for selectively switching the input signal from the speech encoding unit 3, and the input signal from the transmission rate recovering unit 13, reference numeral 21 indicates a selector for selectively switching the input signal from the first pattern interpolating unit 16 and the input signal from the pseudo speech signal producing unit 12, reference numeral 22 indicates a selector for selectively switching the input signal from the second comfort noise generating unit 14 and the input signal from the pseudo speech signal producing unit 12, reference numeral 23 represents a selector for selectively switching the input signal from the first comfort noise generating unit 15 and the input signal from the selector 20, and reference numeral 24 shows an AND gate circuit for outputting "1" when either one of the input signals derived from the first pattern detecting unit 18 and the second pattern detecting unit 19 becomes "1", and outputs "0", if not.

Next, assuming that the voice ATM transmission apparatus 60 equipped with the arrangement shown in FIG. 19 is applied to the positions of the DCME 100, the DCME 101, the DCME 102, and the DCME 103 shown in FIG. 18, operations of this voice ATM transmission apparatus will now be explained.

First, in the case that a telephone communication is established between the telephone set 110 and the telephone set 112 in FIG. 18 (namely, when tandem connection is not made), a description will now be made of operations in the case that the voice ATM transmission apparatus 60 shown in FIG. 18 is installed at the position of the DCME 101.

First of all, in FIG. 19, as the initial condition, the selector 21 selects the input signal from the first pattern interpolating unit 16, the selector 20 selects the input signal from the speech encoding unit 3, the selector 22 selects the input signal from the pseudo speech signal generating unit 12, and the selector 23 selects the input signal from the selector 20, respectively. It should be noted that when the control input signal becomes "0", these selectors 20, 21, 22, 23 select the input signals of the initial condition side.

In the case that the telephone sets are not tandem-connected by the exchange, both the first pattern detecting unit 18 and the second pattern detecting unit 19 do not detect the first pattern signal and the second pattern signal from the input signal of the trunk side. As a result, the first and second pattern detecting units 18 and 19 output "0" which may indicate that these pattern detecting units 18/19 are not operated under detection states. As a result, the operations of the selectors 20, 21, 22, and 23 are not different from the initial conditions. As a consequence, the speech signal path provided on the transmission side may constitute such a path passing through the speech encoding unit 3, the selector 20, the selector 23, and the cell assembling unit 11. Also, the speech signal path provided on the receiving side may constitute such a path passing through the cell disassembling unit 10, the speech decoding unit 9, the first pattern interpolating unit 16, and the selector 21, so that the normal speech decoding operation and the normal speech encoding operation are carried out.

Now, in the receiving-sided path, the first pattern interpolating unit 16 interpolates the first pattern with respect to the PCM speech signal outputted from the speech decoding unit 9. The PCM signal outputted from the speech decoding unit 9 may become a signal of 64 Kbit/s. That is, this PCM signal corresponds to a signal produced by that the speech signal waveform is sampled every 125 microseconds, and then the amplitude of the sampled waveform is quantized by 8 bits, namely 8/125 microseconds=8/0.000125=64000. In order that the speech quality is not degraded due to this pattern interpolation, the first pattern interpolating unit 16 executes such an operation that only LSB contained in the 8-bit quantized value is bit-stolen every several sampling operations so as to embed a specific pattern into this PCM signal. As a result, even when the first pattern is interpolated, while no adverse influence is given to the original PCM speech signal waveform, the telephone communication can be carried out. The voice ATM transmission apparatus located at the DCME 100 which is connected via the bearer circuit to the DCME 101 as the counter-party apparatus is operated in a similar manner to that of the DCME 101.

Next, a description will now be made of operations of such voice ATM transmission apparatus arranged at the positions of the DCME 101 and the DCME 102 in the case that the telephone sets are relay-connected (tandem-connected) by the exchange, namely, in such a case that a telephone communication is established between the telephone set 110 and the telephone set 111 in FIG. 18.

FIG. 20 is a structural diagram for showing such a case that exchange sides of voice ATM transmission apparatuses are relay-connected. It should be noted that the same reference numerals shown in FIG. 18 and FIG. 19 will be employed as those for denoting the same, or similar circuit components indicated in FIG. 20, and explanations thereof are omitted. In FIG. 20, reference numerals 60B and 60C show two voice ATM transmission apparatuses which constitute a pair, and are connected via a exchange 106 to each other.

When such a connection is made by the exchange, as a first stage, the first pattern detecting unit 18 employed in the voice ATM transmission apparatus 60B detects the first pattern which is interpolated by the first pattern interpolating unit 16 employed in the voice ATM transmission apparatus 60C, and then outputs "1" implying such a signal that the first pattern is detected. Also, the second pattern detecting unit 18 employed in the voice ATM transmission apparatus 60C detects the second pattern which is interpolated by the second pattern interpolating unit 16 employed in the voice ATM transmission apparatus 60B, and then outputs "1" implying such a signal that the second pattern is detected. As a consequence, the conditions of both the voice ATM transmission apparatuses 60B and 60C are changed as follows: The output of the AND gate circuit 24 becomes "1", the selector 21 selects/outputs the input signal derived from the second pattern interpolating unit 17, the selector 22 selects/outputs the input signal derived from the second comfort noise generating unit 14, and the selector 23 selects/outputs the input signal derived from the first comfort noise generating unit 15. In the voice ATM transmission apparatuses 60B and 60C operated under this condition, the signal path provided on the receiving side may constitute the second comfort noise generating unit 14, the selector 22, the second pattern interpolating unit 17, and the selector 21, whereas the signal path provided on the transmission side may constitute the first comfort noise generating unit 15, the selector 23, and the cell assembling unit 11.

In this case, the second comfort noise generating unit 14 outputs the comfort noise having the 64 Kbit/s PCM format. The second pattern interpolating unit 17 interpolates; the second pattern with respect to the PCM signal outputted from the second comfort noise generating unit 14. In order that this second pattern can be discriminated from the above-explained first pattern, and also does not give a large adverse influence to the outputs of the comfort noise generating unit, the following operation is carried out. For example, only second bit located at the lower bits of the 8-bit quantized value is bit-stolen every several sampling operations with respect to the input PCM signal, and a specific pattern is embedded. As previously explained, the voice ATM transmission apparatuses 60B and 60C may output a silent PCM signal into which the second pattern has been interpolated with respect to the exchange side. Also, the first comfort noise generating unit 15 outputs either 8 Kbit/s encoded silent signal or the comfort noise. As a result, the voice ATM transmission apparatuses 60B and 60C may also output either the silent signal or the comfort noise with regard to the bearer circuit side.

At the next stage, such a silent PCM signal into which the second pattern has been interpolated is entered from the exchange side to the voice ATM transmission apparatuses 60B and 60C. As a result, the second pattern detecting unit 19 detects the second pattern in this silent PCM signal, and thus, outputs "1" indicative of this pattern detection. As a consequence, the selector 20 selects the input signal derived from the transmission rate recovering unit 13 to output the selected signal. Since the first pattern detecting unit 18 does not detect the first pattern, this first pattern detecting unit 18 outputs "0" indicative of no pattern detection. As a result, the condition is changed in such a manner that the selector 23 selects/outputs the input signal derived from the selector 20, and the selector 22 selects/outputs the input signal produced from the pseudo speech signal producing unit.

As to the state of the selector 21, since the output from the AND gate circuit 24 maintains the state of "1" (since second pattern is detected instead of first pattern), this selector 21 maintains such a state that the input signal from the second pattern detecting unit 17 is selected to be outputted. It should be noted that the pseudo speech signal producing unit 12 produces the pseudo speech signal of 64 Kbit/s by adding the dummy bit to the 8 Kbit/s encoded signal entered from the cell disassembling unit. The second pattern is interpolated to a portion of this pseudo speech signal by the second pattern interpolating unit. In other words, the 8 Kbit/s encoded signal is outputted without any problem by assembling the pseudo speech signal in such a way that a portion to be destroyed may constitute a dummy bit. Since this pseudo speech signal is inputted into the transmission rate recovering unit 13, the 8 Kbit/s encoded signal is extracted from this pseudo speech signal to be supplied to the selector 20.

When the apparatus is operated in accordance with the above-explained manner, it can be seen that the pass-through operation can be realized. In other words, in the voice ATM transmission apparatus 60B, the encoded signal whose cells are disassembled by the cell disassembling unit 10 is finally transmitted to the cell assembling unit 11 of the voice ATM transmission apparatus 60C, whereas to the contrary, in the voice ATM transmission apparatus 60C, the encoded signal whose cells are disassembled by the cell disassembling unit 10 is finally transmitted to the cell assembling unit 11 of the voice ATM transmission apparatus 60B.

If the above-described tandem pass-through function is applied also to the DCME shown in FIG. 16, it is expectable that even when the telephone speech signal is transmitted via a plurality of DCME links, this telephone speech signal can be transmitted without degrading the sound quality thereof.

However, when this tandem pass-through technique is applied to a DCME, the below-mentioned problems occur.

For example, the following case will now be considered. That is, in the FIG. 18, the tandem pass-through operation is realized in the case that while a telephone communication is established between the telephone set 110 and the telephone set 111, this communication signal is transmitted through a single trunk channel connected between the DCME 101 and the DCME 102.

In this case, the assignment of the bearer circuit from the DCME 100 to the DCME 101 is changed, depending upon both the active/silence state and the signal discrimination state, which are detected in the DCME 100. For example, when the telephone communication signal produced from the telephone set 100 becomes silent (silent), the connection between the bearer circuit and this trunk channel along the direction defined from the DCME 100 to the DCME 101 may be removed. This information on bearer assignment may be notified by embedding the active/silence information into the pseudo speech signal which is transmitted from the DCME 101 to the DCME 102. Then, the DCME 102 may determine the assignments of this trunk channel to the bearer circuit based upon the active/silence information embedded in this pseudo speech signal.

However, when the bearer circuit is assigned, such a channel operated under silent state is searched from the trunk channels under connection with the bearer circuit, and thereafter, the bearer circuit assignment must be rearranged. Assuming now that all of the trunk channels connected to the bearer circuits are operated under active states, the bearer circuit assignments of a trunk channel witch newly become under active state may be waited. When the bearer circuit assignment is brought into the waiting state, a portion of the "active" speech signal is dropped, and therefore, a so-called "freeze out" phenomenon will occur. In general, if the time rate of the "freeze out" phenomenon occurs with respect to the entire active time, namely freeze out fraction ratio is smaller than, or equal to 0.5 percents, substantially no detection can be made of degradations in telephone communications.

However, when such a freeze out phenomenon occurs in the trunk channel operated under tandem pass-through connection, not only a portion of the speech signal is dropped out, but also another problem may be newly produced. That is, the speech coding device and the speech decoding device cannot be reset in the synchronous resetting mode. It should also be noted that such a freeze out phenomenon may be produced by limiting a total number of messages.

As previously explained, when the synchronous resetting operation cannot be realized between the speech coding device and the speech decoding device, the internal parameters of both devices are not made coincident with each other. As a result, degradations of the telephone communication quality may be considerably induced.

Furthermore, a similar inconvenient case may occur in such a case that the speech encoding rate is changed, due to the change in the speech/data discrimination state, and thus, the bearer circuit assignment rate is changed.

For instance, considering now such a condition that the bearer circuit assignment rate from the DCME 100 to the DCME 101 is changed from 8 Kbit/s to 40 Kbit/s, the tandem pass-through function may be expectedly realized when the following operation is basically carried out. That is, similar to the active/silence information, while the encoding rate information is embedded in the pseudo speech signal, the bearer circuit assignment is determined based on this information in the DCME 102.

However, in such a case that a change in the bearer circuit assignment rate is brought into a waiting state in the DCME 102 due to a lack of total bearer circuit capacity to be assigned and also a limitation in total message number, such a problem may occur in which in this trunk channel, there is no signal to be outputted to the bearer circuit (namely, bearer circuit assignment is selected to be 8 Kbit/s whereas encoded data extracted from pseudo speech signal is 40 Kbit/s). As a result, while such a problem is continued, a certain invalid signal should be necessarily outputted to the DCME 103. As a consequence, there is a certain possibility that extraordinary sounds may be reproduced from the speech decoding device in the DCME 103.

Also, when the bearer circuit assignment rate is changed into 40 Kbit/s after a certain time period has passed, since the encoded data are lost by such a data quantity corresponding to the waiting time period for the assignment change, the internal parameter of the speech decoding device employed in the DCME 100 is not made coincident with the internal parameter of the speech decoding device employed in the DCME 103, resulting in degradation in the telephone communication quality.

As described above, in the conventional technique, when the tandem pass-through function is attempted to be installed in DCME, the bearer circuit assignment change is delayed, with the result that a speech coding device and a speech decoding device can not be reset in a synchronous resetting mode in DCME provided on both ends of the transmission path, which causes disagreement of the internal parameter thereof, and arises a problem of degradation in the telephone communication quality.

SUMMARY OF THE INVENTION

The present invention has been made to solve the problems of the prior art, and therefore, has an object to provide such a digital circuit multiplication equipment equipped with a tandem pass-through function, by which a speech coding device and a speech decoding device can be reset in a synchronous resetting mode.

In a digital circuit multiplication equipment equipped with a tandem pass-through function capable of passthrough-transmitting a signal with respect to a trunk channel repeated/connected thereto via a exchange, while not performing both a low-bit-rate speech encoding operation and also a low-bit-rate speech decoding operation, the digital circuit multiplication equipment according to an aspect of the invention comprises means for transmitting (notifying) the number of trunk channel operated under pass-through operation to another digital circuit multiplication equipment connected via a bearer circuit and means for continuously assigning a bearer circuit with respect to the number of trunk channel number operated under pass-through operation.

Also, it is characterized in that said means for transmitting (notifying) the number of said trunk channel operated under pass-through operation to another digital circuit multiplication equipment connected thereto via the bearer circuit transmits (notifies) the trunk channel number by employing a specific bearer channel number contained in an assignment message of a bearer circuit.

Further, it is characterized in that said means for transmitting (notifying) the number of said trunk channel operated under pass-through operation to another digital circuit multiplication equipment connected thereto via the bearer circuit transmits (notifies) the trunk channel number by employing a specific bearer channel number contained in an assignment message of a bearer circuit.

Furthermore, in a digital circuit multiplication equipment equipped with a tandem pass-through function capable of passthrough-transmitting a signal with respect to a trunk channel repeated/connected thereto via a exchange, while not performing both a low-bit-rate speech encoding operation and also a low-bit-rate speech encoding operation, the digital circuit multiplication equipment according to another aspect of the invention comprises means for continuously assigning a trunk channel operated under pass-through operation to a bearer circuit.

Still further, in a digital circuit multiplication equipment equipped with a tandem pass-through function capable of passthrough-transmitting a signal with respect to a trunk channel repeated/connected thereto via a exchange, while not performing both a low-bit-rate speech encoding operation and also a low-bit-rate speech encoding operation, the digital circuit multiplication equipment according to a further aspect of the invention comprises means for embedding information into a signal which is outputted with respect to a trunk channel operation under pass-through operation, said information indicating as to whether or not a encoded speech signal derived from a bearer circuit is present, means for detecting from an input signal of a trunk channel operated under pass-through operation, information indicating as to whether or not said encoded speech signal derived from said bearer circuit is present, means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation, a speech decoding device for outputting only a signal different from said first invalid encoded signal, and means for outputting a silent (silent) PCM signal in a trunk channel which receives said first invalid encoded signal from the bearer circuit.

Yet still further, in a digital circuit multiplication equipment equipped with a tandem pass-through function capable of passthrough-transmitting a signal with respect to a trunk channel repeated/connected thereto via a exchange, while not performing both a low-bit-rate speech encoding operation and also a low-bit-rate speech encoding operation, the digital circuit multiplication equipment according to an additional aspect of the invention comprises means for synthesizing a first invalid encoded signal which indicates that in a trunk channel operated under pass-through operation, where an input signal from a bearer circuit is not supplied, a encoded signal thereof is invalid with an output signal of said trunk channel a speech decoding device for outputting only a signal different from a signal for indicating that the encoded signal is invalid with respect to said bearer circuit and means for outputting a silent PCM signal in a trunk channel for receiving said first invalid encoded signal from the bearer circuit.

Furthermore, it is characterized in that said digital circuit multiplication equipment is further comprises means for determining an assignment of the trunk channel operated under pass-through operation to the bearer circuit by employing such information for indicating as to whether or not a encoded speech signal derived from the bearer circuit is present in the input signal of the trunk channel and means for delaying a encoded signal contained in an input signal of a trunk channel in such a case that when a state under which the encoded speech signal is not present from the bearer circuit contained in the input signal of the trunk channel operated under pass-through operation is transmitted to another state under which the encoded speech signal is present, the assignment of said trunk channel to the bearer circuit is delayed, and for starting to output said delayed encoded signal after the trunk channel has been assigned to the bearer circuit.

In addition, it is characterized in that said digital circuit multiplication equipment is further comprise means for outputting encoded speech signals which correspond to plural frames and have been inputted from the bearer circuit in the past with respect to the trunk channel operated under pass-through operation, means for extracting said encoded speech signal corresponding to the plural frames from the input signal of the trunk channel operated under pass-through operation and means for outputting old encoded speech signals by the delayed assignment number from the encoded speech signals corresponding to the plural frames, which are extracted from the input signal of said trunk channel in such a case that when a state under which the encoded speech signal is not present from the bearer circuit contained in the input signal of the trunk channel operated under pass-through operation is transmitted to another state under which the encoded speech signal is present, the assignment of said trunk channel to the bearer circuit is delayed, and for starting to output said delayed encoded signal after the trunk channel has been assigned to the bearer circuit.

Still further, it is characterized in that said digital circuit multiplication equipment is further comprises means for embedding information indicative of a encoding rate of a encoded speech signal from the bearer circuit into a signal which is outputted with respect to a trunk channel operated under pass-through operation, means for detecting the information indicative of said encoding rate from the input signal of the trunk channel operated under pass-through operation, means for determining an assignment of said trunk channel to the bearer circuit by using said encoding rate detected from the input signal of the trunk channel operated under pass-through operation, and means for delaying the encoded signal contained in the input signal of the trunk channel in such a case that when the encoding rate of the encoded speech signal contained in the input signal of the trunk channel operated under pass-through operation is transmitted, the assignment rate change of said trunk channel to the bearer circuit is delayed, and for starting to output the delayed encoded signal after the bearer circuit assignment rate has been changed.

Yet still further, it is characterized in that said digital circuit multiplication equipment is further comprises means for outputting a second invalid encoded signal to the bearer circuit until the assignment rate to the bearer circuit is changed, said second invalid encoded signal indicating that said signal is an invalid encoded speech signal, in such a case that when the encoding rate of the encoded speech signal contained in the input signal of the trunk channel operated under pass-through operation is transmitted, the assignment rate change of said trunk channel to the bearer circuit is delayed, a speech decoding device for outputting only such a signal different from both said first invalid encoded signal and said second invalid encoded signal, and means for outputting a silent PCM signal in the case that said first invalid encoded signal is entered from the bearer circuit, and also for outputting a prediction PCM signal for predicting a PCM signal which should be subsequently outputted in such a case that said second invalid encoded signal is inputted.

Moreover, it is characterized in that said digital circuit multiplication equipment is further comprises means for embedding information indicative of a encoding rate of a encoded speech signal from the bearer circuit into a signal which is outputted with respect to a trunk channel operated under pass-through operation, means for detecting the information indicative of said encoding rate from the input signal of the trunk channel operated under pass-through operation, means for determining an assignment of said trunk channel to the bearer circuit by using said encoding rate detected from the input signal of the trunk channel operated under pass-through operation, means for delaying the encoded signal contained in the input signal of the trunk channel in such a case that when the encoding rate of the encoded speech signal contained in the input signal of the trunk channel operated under pass-through operation is transmitted from a low rate to a high rate, the assignment rate change of said trunk channel to the bearer circuit is delayed, and for starting to output the delayed encoded signal after the assignment rate the bearer circuit has been changed, means for outputting a second invalid encoded signal to the bearer circuit until the assignment rate to the bearer circuit is changed, said second invalid encoded signal indicating that said signal is an invalid encoded speech signal, in such a case that when the encoding rate of the encoded speech signal contained in the input signal of the trunk channel operated under pass-through operation is transmitted from the low rate to the high rate, the assignment rate change of said trunk channel to the bearer circuit is delayed, means for synthesizing the encoded signal contained in the input signal of said trunk channel with such information for indicating such a fact that the encoded signal of the lower encoding rate is contained in the case that when the encoding rate of the encoded speech signal contained in the input signal of the trunk channel operated under pass-through operation is transferred from a high rate to a low rate, the assignment rate change of said trunk channel to the bearer circuit is delayed, and then for outputting the synthesized encoded signal to the bearer circuit, a speech decoding device for outputting only such a signal different from both said first invalid encoded signal and said second invalid encoded signal, and means for outputting a silent PCM signal in the case that said first invalid encoded signal is entered from the bearer circuit, and for outputting a prediction PCM signal for predicting a PCM signal which would be subsequently outputted in such a case that said second invalid encoded signal is inputted; and further for extracting the encoded signal of the low rate to be decoded into a PCM signal in such a case that such a signal is inputted in which said encoded signal of the low rate is synthesized with the information for indicating that the encoded signal of the low rate is contained.

Still, it is characterized in that when a speech encoding system corresponds to the ADPCM system defined in the ITU-T recommendation G.726, a encoded signal which is not defined by said ITU-T recommendation and contains such encodes, all of which for 1 sample are equal to "1", is used as said first invalid encoded signal.

Further still, it is characterized in that when a speech encoding system corresponds to the CELP system, a encoded signal containing a vector is used as said first invalid encoded signal, the use frequency of which vector being low when a speech signal is inputted into the encoding device.

In addition, it is characterized in that when a speech encoding system corresponds to the ADPCM system defined in the ITU-T recommendation G.726, a encoded signal which contains such encodes, all of which for 1 sample are equal to "1", which is not defined by said ITU-T recommendation, is used as said second invalid encoded signal.

Finally, it is characterized in that when a speech encoding system corresponds to the CELP system, a encoded signal containing a vector is used as said second invalid encoded signal, the use frequency of which vector being low when a speech signal is inputted into the encoding device.

BRIEF DESCRIPTION OF THE PREFERRED EMBODIMENTS

For a better understanding of the present invention, reference is made of a detailed description to be read in conjunction with the accompanying drawings, in which.

DETAILED DESCRIPTION OF THE PREFERRED EMBODIMENTS

Embodiment Mode 1

Figure 1:
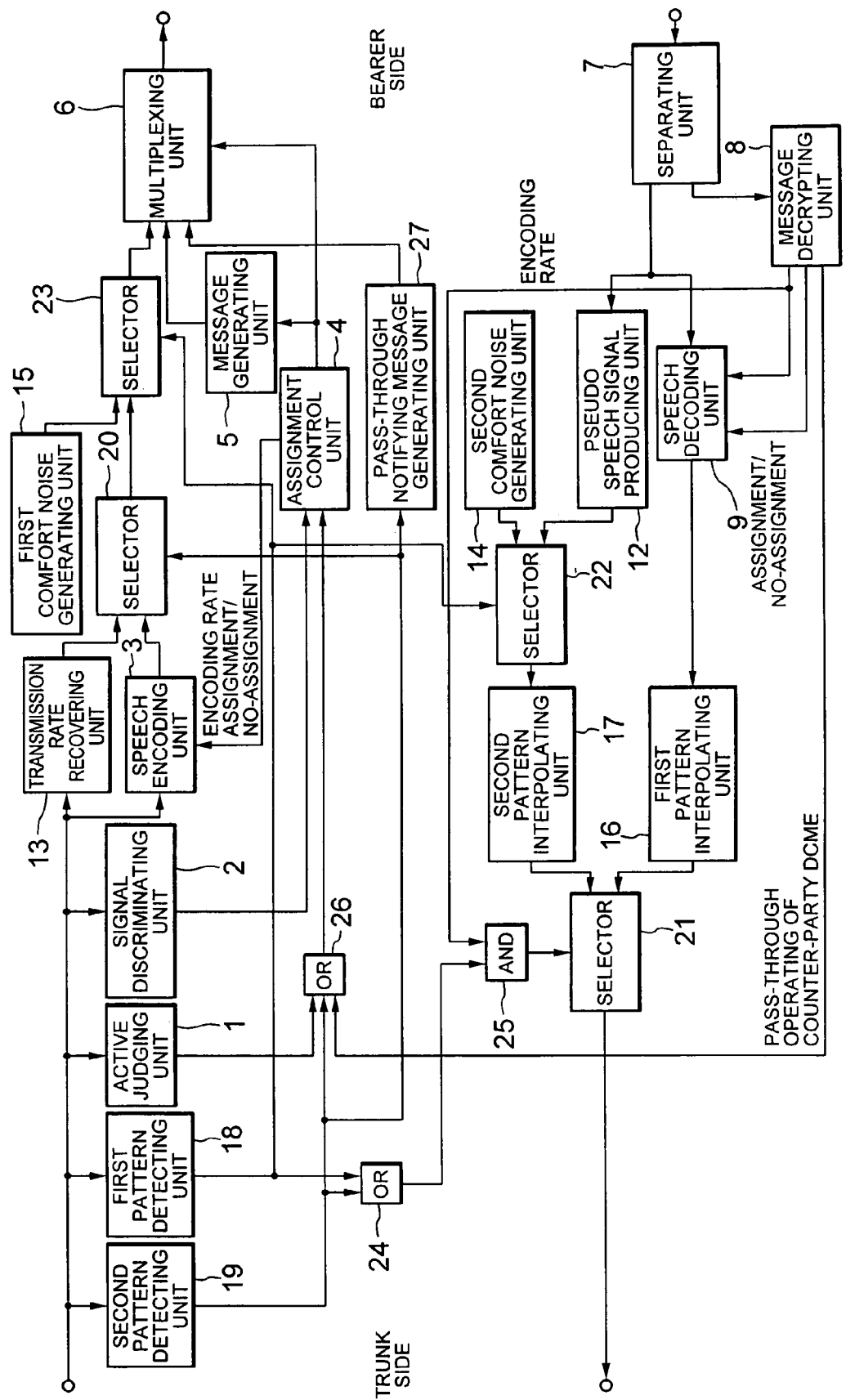
FIG. 1 is a schematic block diagram for showing an entire arrangement of a digital circuit multiplication equipment (DCME) according to an embodiment mode 1 of the present invention.

FIG. 1 is a block diagram for schematically representing an entire arrangement of a digital circuit multiplication equipment (DCME) according to an embodiment mode 1 of the present invention.

Figure 16:
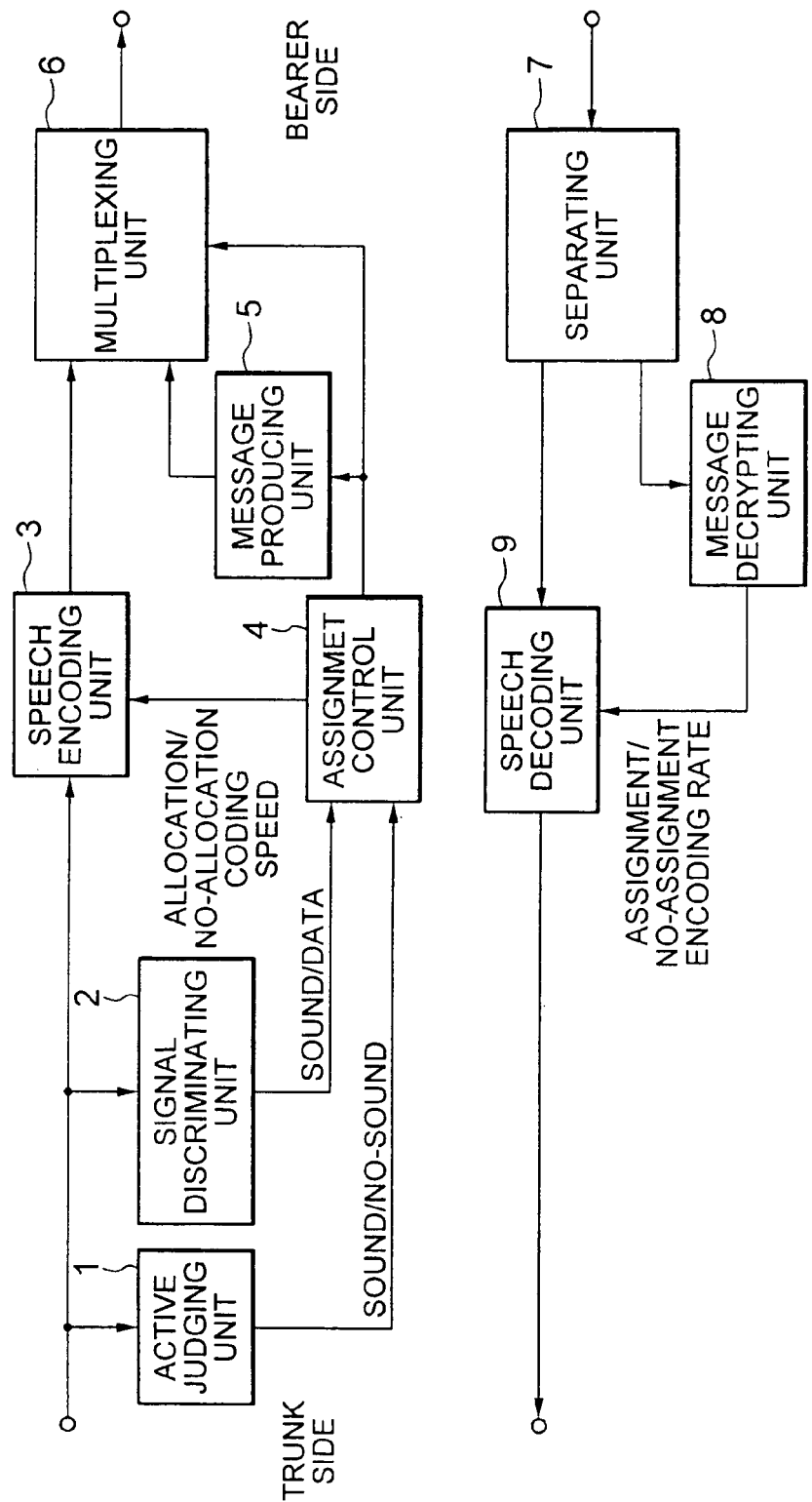
FIG. 16 is a schematic block diagram for showing the entire arrangement of the conventional digital circuit multiplication equipment (DCME)
Figure 19:
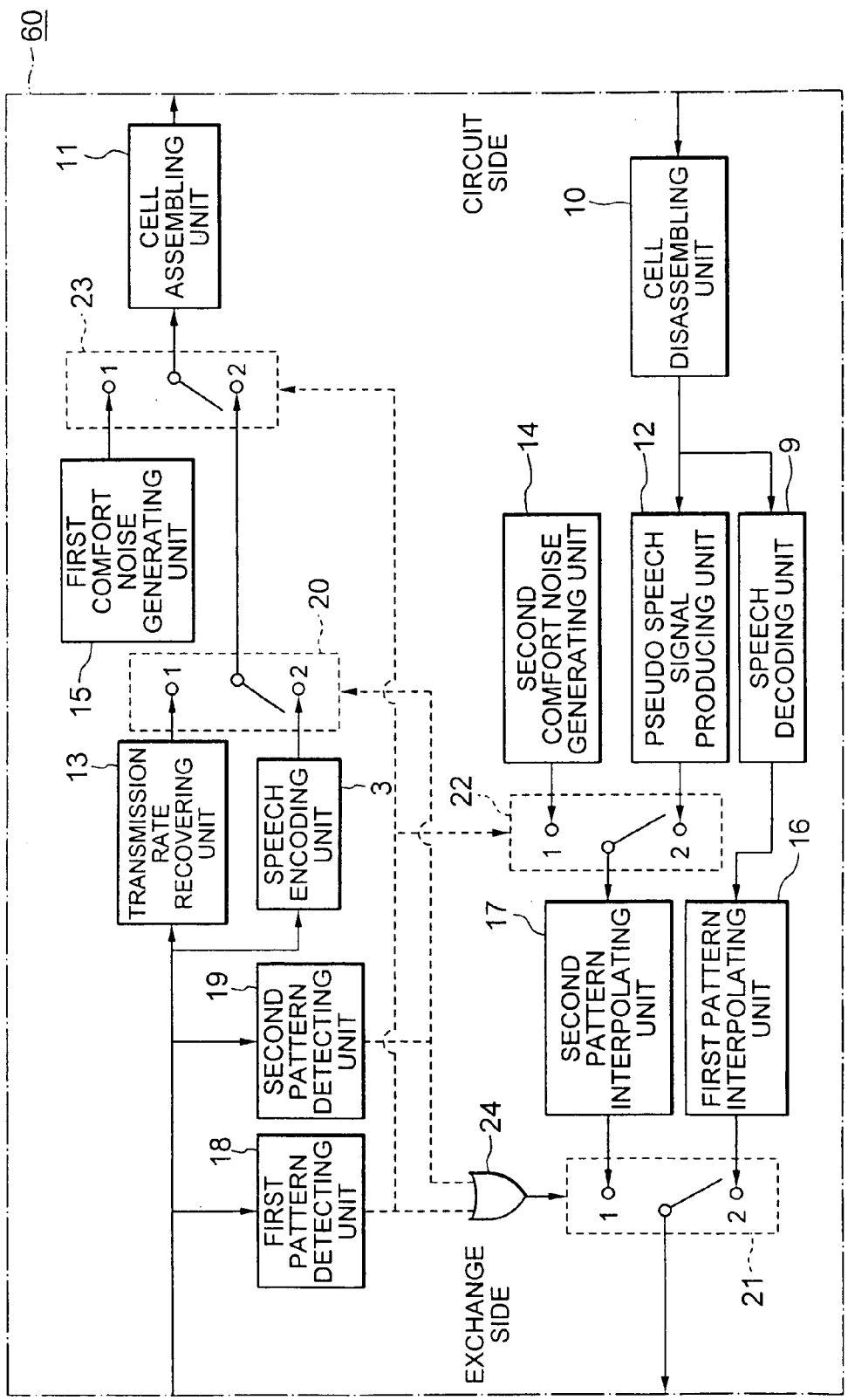
FIG. 19 is a schematic diagram for schematically showing the voice ATM transmission apparatus 60 equipped with the tandem pass-through function, disclosed in Japanese Laid-open Patent Application No. Hei-10-190667.
Figure 20:
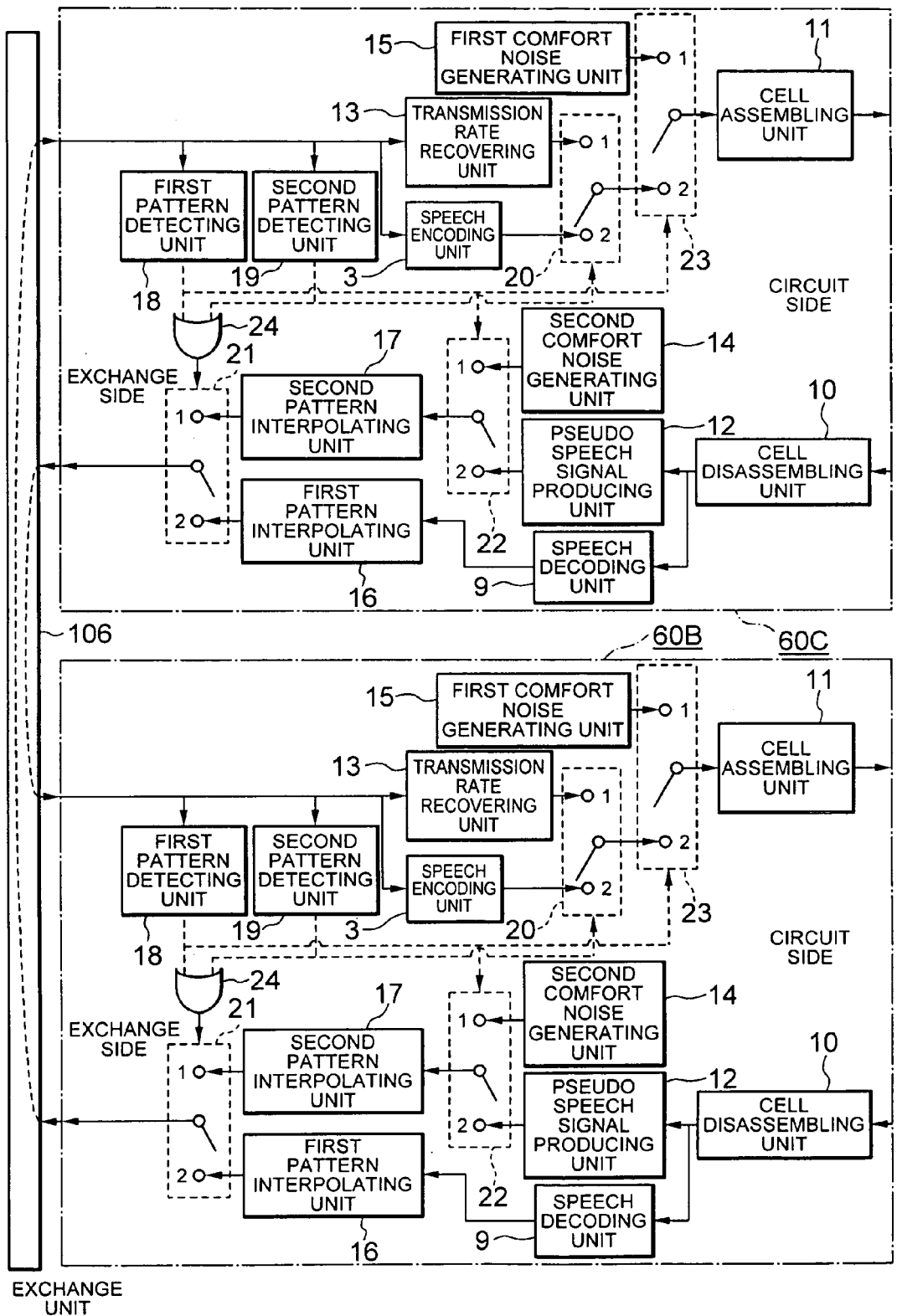
FIG. 20 is a schematic diagram for schematically representing such a case that the switching-unit-sided terminal of the voice ATM transmission apparatus is connected.

It should be noted that the same reference numerals shown in FIG. 16, FIG. 19, and FIG. 20 will be employed as those for denoting the same, or the same circuit units indicated in FIG. 1, and explanations thereof are omitted. In FIG. 1, newly employed reference numerals are given as follows: That is, reference numeral 25 indicates an AND gate circuit, reference numeral 26 represents an OR gate circuit, and reference numeral 27 indicates a pass-through notifying message generating unit. The pass-through notifying message generating unit 27 generates a message used to notify a trunk channel operated under pass-through operation to a DCME on the opposite side of the bearer functioning as a counter-party apparatus.

Next, operations of the digital circuit multiplication equipment (will be simply referred to as a "DCME" hereinafter) indicated in FIG. 1 will be described.

In FIG. 1, a active judging unit 1, a signal discriminating unit 2, a speech (audio) encoding unit 3, an assignment control unit 4, a multiplexing unit 6, a separating unit 7, a message decrypting unit 8, and also a speech (audio) decoding unit 9 are operated in a similar manner to those of the DCME indicated in FIG. 16. In addition to the operation of the DCME shown in FIG. 16, a new operation required to realize a pass-through operation is additionally provided with this message decrypting unit 8 which will be described later. It should also be noted that each of the below-mentioned circuit blocks performs a plurality of functional operations, a total number of which is equal to a total number of trunk channels stored in the DCME, namely plural functional operations for 600 channels. These functional operations are independently carried out every channel. The functional operations for one channel are carried out in a similar manner to those of the circuit block having the same reference numerals in the voice ATM transmission apparatus shown in FIG. 19. These circuit blocks are a pseudo speech signal producing unit 12, a transmission rate recovering unit 13, a second comfort noise generating unit 14, a first comfort noise unit 15, a first pattern interpolating unit 16, a second pattern interpolating unit 17, a first pattern detecting unit 18, a second pattern detecting unit 19, a selector 20, a selector 21, a selector 22, a selector 23, and an OR gate circuit 24.

In this case, a description will now be made of operations in the following case. That is, in FIG. 18, while a telephone communication is established between a telephone set 100 and another telephone set 110, a trunk channel number "n" (TCn) of a DCME 101 and a trunk channel number "n" (TCn) of another DCME 102 are repeated/connected by a exchange 106. It should also be noted that each of the respective circuit blocks except for the below-mentioned circuit blocks shown in FIG. 1 performs a plurality of functional operations, a total number of which is equal to a total number of trunk channels stored in the DCME, namely plural functional operations for 600 channels in a parallel manner. These functional operations are independently carried out every channel. The functional operations for one channel are carried out in a similar manner with each other. As a consequence, it is now assumed that all of the below-mentioned operation explanations as to all of these circuit blocks are given to the trunk channel number "n" (TCn). These circuit blocks are the assignment control unit 4, the message producing unit 5, the multiplexing unit 6, the separating unit 7, the message decrypting unit 8, and the pass-through notifying message generating unit 27.

In the DCME 101, the second pattern detecting unit 19 detects a second pattern from a PCM (pulse code modulation) signal inputted from the trunk side, and then sets an output control signal to "1." As a result, since the control signal entered from the second pattern detecting unit 19 is equal to "1", the OR gate circuit 26 outputs "1" as an output control signal with respect to the assignment control circuit 4 irrespective of an input signal derived from the active judging unit 1. This output control signal of "1" indicates that a sound is present.

Also, the pass-through notifying message generating unit 27 generates a message when the control signal input of the trunk channel number TCn supplied from the second pattern detecting unit 19 is "1". This generated message is to notify to the counter-party DCME 100 on the opposite side of the bearer, such a fact that the trunk channel number TCn commences the pass-through operation. The pass-through notifying message generating unit 27 transmits this message from the multiplexing unit 6 via the bearer circuit to the DCME 100 connected opposite thereto.

Figure 17:
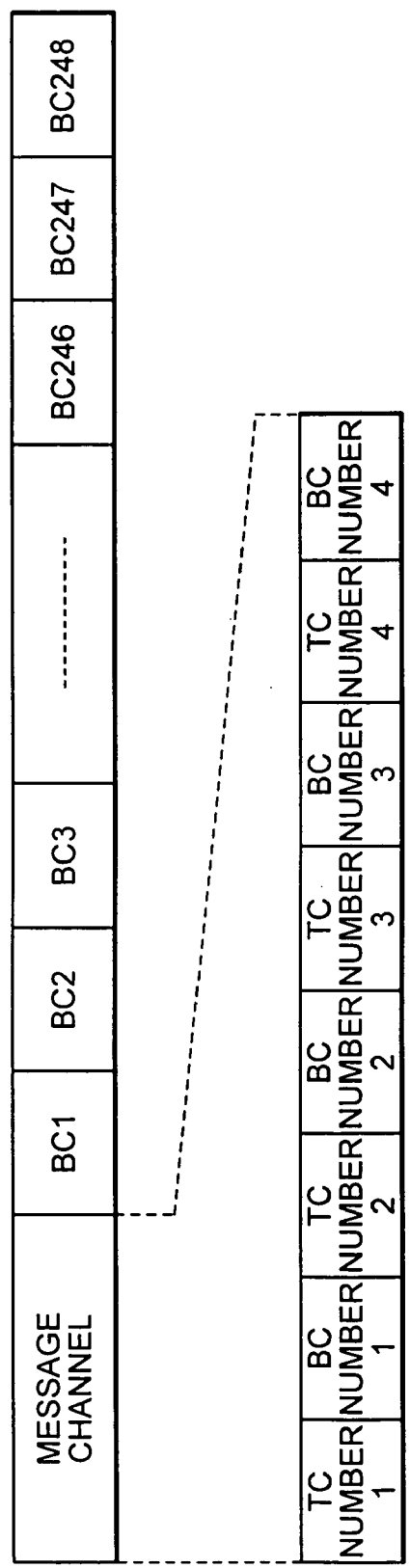
FIG. 17 is a frame (DCME frame) structural diagram of the signal outputted by the digital circuit multiplication equipment (DCME) to the bearer circuit.

As previously explained with reference to FIG. 17, a single message is made by combining a trunk channel number (TC number) with a bearer channel number (BC number). Since the bearer channel numbers under use are defined from 1 to 248, a bearer channel number (BC number) "249" is used as a pass-through operation starting-message. For instance, such a message that TC number=n and BC number=249 implies that the trunk channel number "TCn" commences the pass-through operation. Also, a bearer channel number BC number=250 implies a pass-through operation ending message. When the control signal of the trunk channel number TCn derived from the second pattern detecting unit 19 is changed from "1" into "0", the pass-through notifying message generating unit 27 outputs the pass-through operation ending message.

It should also be noted that the encoding rate information of each of the trunk channels which is outputted from the message decrypting unit 8 to the speech decoding unit 9 is also entered into the AND gate circuit 25. In this case, as this encoding rate information, when the encoding rate of the relevant trunk channel is equal to 40 Kbit/s, a control signal of "0" is outputted whereas when the encoding rate of the relevant trunk channel is equal to 8 Kbit/s, a control signal of "1" is outputted. As a consequence, if the encoding rate of the trunk channel number TCn is equal to 8 Kbit/s, since the control signal of TCn outputted from the message decrypting unit 8 becomes "1", the output signal outputted from the AND gate circuit 25 is identical to the input signal derived from the OR gate circuit 24. As a result, the AND gate circuit 25 gives no adverse influence to the selection operation of the selector 12.

Conversely, if the encoding rate of the trunk channel number TCn is equal to 40 Kbit/s, since the control signal of TCn outputted from the message decrypting unit 8 becomes "0", the output signal outputted from the AND gate circuit 25 is continuously identical "0", so that the selector 21 continuously selects the input signal supplied from the first pattern interpolating unit 16 to output this selected input signal to the exchange side. This operation implies that the pass-through operation is not carried out.

As explained above, the AND gate circuit 25 may have such a function that the pass-through operation is not carried out with respect to the trunk channel through which the voice-band data is transmitted.

Figure 18:
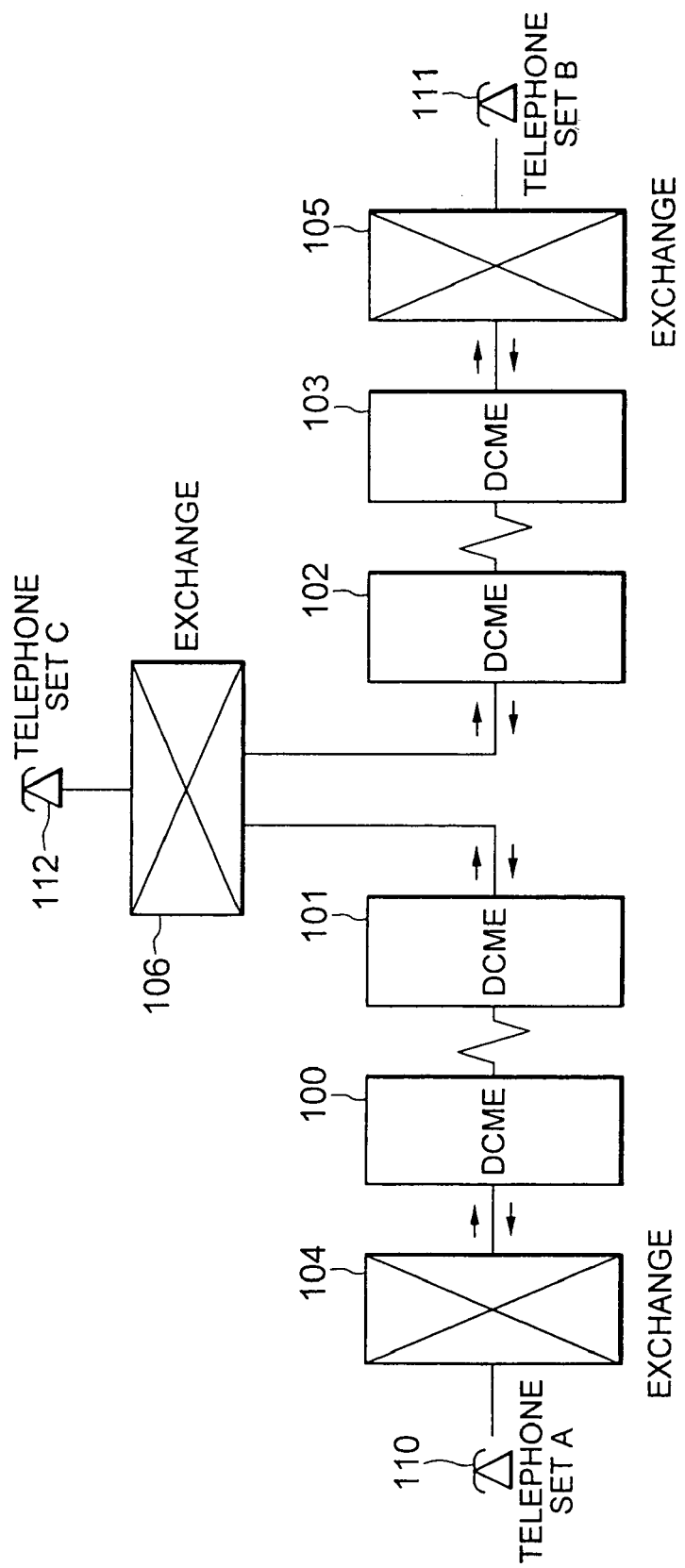
FIG. 18 is a schematic diagram for schematically indicating the network in which the digital circuit multiplication equipmentes (DCME) are arranged at three points.

On the other hand, in the DCME 100 shown in FIG. 18, when the message decrypting unit 8 recognizes that the message indicative of starting of the pass-through operation of TCn is received from the DCME 101 on the opposite side of the bearer functioning as the counter-party apparatus, this message decrypting unit 8 sets the output control signal of TCn to "1" with respect to the OR gate circuit 26. It should be noted that in the DCME 101 on the opposite side of the bearer functioning as the counter-party apparatus, the output control signal to the OR gate circuit 26 becomes "0" as to such a trunk channel TC which is not operated under pass-through operation (namely, DCME 101 does not receive such a message of starting of pass-through operation). When the control signal supplied from the message decrypting unit 8 is equal to "1", the OR gate circuit 26 outputs "1" as the output control signal to the assignment control unit 4 irrespective of the input signal derived from the active judging unit 1. This output control signal of "1" indicates that a sound is present.

It should be understood that the operation of the DCME 102 is carried out in completely the same manner to that of the DCME 101, and also the operation of the DCME 103 is carried out in completely the same manner to that of the DCME 100 in FIG. 18.

Then, when the DCMEs are operated in the above-described manner, in both the DCME 101 and the DCME 102 shown in FIG. 18, as to the trunk channel repeated/connected by the exchange 106, neither the speech encoding operation, nor the speech decoding operation is performed. However, the assignment to the bearer circuits is continuously carried out in order that the trunk channel is not only operated as the pass-through operation, but also is always recognized as the sound channel. Also, as to the DCME 100 connected opposite to the DCME 101 and also the DCME 103 connected opposite to the DCME 102, the bearer circuits of the trunk channels operated under tandem pass-through operation in the DCME 101 and the DCME 102 are continuously assigned to the bearer circuits. It should also be noted that this channel assignment is only limited to such a case that the encoding rate is selected to be 8 Kbit/s. Conversely, when the encoding rate is selected to be 40 Kbit/s, since the second pattern interpolation is not carried out, the pass-through operation is also not carried out. In other words, since there is no change in the assignment operation of the bearer circuits with respect to the trunk channel operated under tandem pass-through operation, the following problem never occurs. That is, the synchronous resetting operations of the speech decoding device and also of the speech decoding device cannot operate properly. As a consequence, the tandem pass-through function can be realized without degrading the telephone communication quality.

Embodiment Mode 2

In the above-described embodiment mode 1, the pass-through operation starting/ending message are produced by employing the unused bearer channel number BC. Alternatively, an unused trunk channel number TC may be employed so as to produce such pass-through operation starting/ending messages. For instance, since a total number of trunk channels stored in the DCME is equal to 600 channels, the TC numbers=601 and 602 are not used as the bearer circuit assignment message. As a consequence, even when such a message that the TC number=601 and the BC number=m indicates that the trunk channel presently connected to m-th BC starts the pass-through operation, whereas such a message that the TC number=602 and the BC number=m indicates that the trunk channel presently connected to the m-th BC ends the pass-through operation, a similar operation to that of the above-explained embodiment mode 1 can be realized.

Embodiment Mode 3

Figure 2:
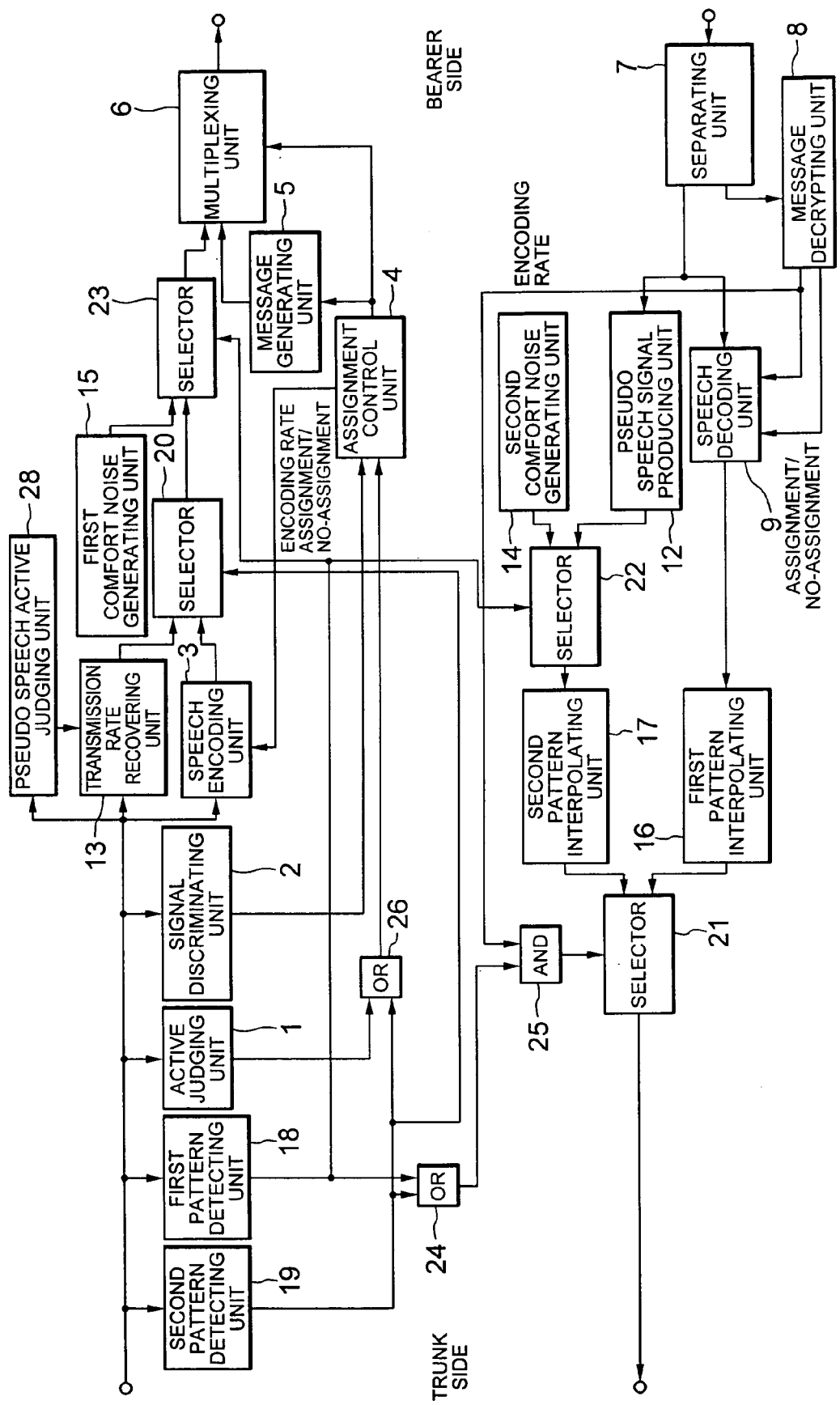
FIG. 2 is a schematic block diagram for representing an entire arrangement of a digital circuit multiplication equipment (DCME) according to an embodiment mode 3 of the present invention.

FIG. 2 is a block diagram for schematically representing an entire arrangement of a digital circuit-multiplication equipment (DCME) according to an embodiment mode 3 of the present invention. It should be noted that the same reference numerals shown in the embodiment mode 1 of FIG. 1 will be employed as those for indicating the same, or similar circuit units represented in FIG. 2, and explanations thereof are omitted. As a newly employed reference numeral, reference numeral 28 shows a pseudo speech active judging unit for judging as to whether a encoded signal is contained in a pseudo speech (audio) signal outputted from a pseudo speech signal producing unit 12.

Next, operations of the digital circuit multiplication equipment (will be simply referred to as a "DCME" hereinafter) indicated in FIG. 2 will be described.

In FIG. 2, a active judging unit 1, a signal discriminating unit 2, a speech (audio) encoding unit 3, an assignment control unit 4, a multiplexing unit 6, a separating unit 7, a second comfort noise generating unit 14, a first comfort noise unit 15, a first pattern interpolating unit 16, a second pattern interpolating unit 17, a first pattern detecting unit 18, a second pattern detecting unit 19, a selector 20, a selector 21, a selector 22, a selector 23, also an OR gate circuit 24, and an AND gate circuit 25 are operated in a similar manner to those of the DCME shown in FIG. 1. The message decrypting unit 9 is operated in a similar manner to that of the DCME shown in FIG. 16. In addition to similar operations to those of the DCME shown in FIG. 1, the speech encoding unit 3, the speech decoding unit 9, and the transmission rate recovering unit 13 are operated with new operation manners (will be explained later).

Similar to the explanation of the operations by the DCME shown in FIG. 1, in FIG. 18, while a telephone communication is established between a telephone set 100 and another telephone set 110, a trunk channel number "n" (TCn) of a DCME 101 and a trunk channel number "n" of another DCME 102 are repeated/connected by a exchange 106 (namely trunk channel numbers TCn in DCME 100 and DCME 103 are also used in telephone communication between telephone 100 and telephone 110). It should also be noted that each of the respective circuit blocks except for the below-mentioned circuit blocks shown in FIG. 2 performs a plurality of functional operations, a total number of which is equal to a total number of trunk channels stored in the DCME in a parallel manner. These functional operations are independently carried out every channel. The functional operations for one channel are carried out in a similar manner with each other. As a consequence, it is now assumed that all of the below-mentioned operation explanations as to all of these circuit blocks are given to the trunk channel number "n" (TCn). These circuit blocks are the assignment control unit 4, the message producing unit 5, the multiplexing unit 6, the separating unit 7, and the message decrypting unit 8.

Similar to the DCME shown in FIG. 1, in the DCME 101 and the DCME 102, the selector 22 selects the input signal supplied from the pseudo speech signal producing unit 12, and the selector 21 selects the input signal supplied from the second pattern interpolating unit 17, the selector 20 selects the input signal supplied from the transmission rate recovering unit 13, and further the selector 23 selects the input signal derived from the selector 20 to output this selected signal. As a result, it is apparent that the trunk channel number TCn is operated under pass-through operation. Since the DCME shown in FIG. 2 does not contain the pass-through notifying message producing unit 27 existed in the DCME of FIG. 1, even when the trunk channel number TCn is operated under pass-through operation, there are some cases that the TCn is not assigned to the bearer circuit in the DCMEs (DCME 100 and DCME 103) located at both ends in FIG. 18. This implies such a case that there is no input signal supplied from the bearer circuit even for the TCn operated under pass-through operation in the DCME 101 and the DCME 102 shown in FIG. 18.

As a result, the pseudo speech signal producing unit 12 is operated as follows: The active/silence information is added to the encoded signal of 8 Kbit/s entered from the separating unit 7, and dummy data is further added thereto, so that such a pseudo speech signal of 64 Kbit/s may be outputted from this pseudo speech signal producing unit 12. As the above-explained active/silence information, when the encoded signal of 8 Kbit/s is not inputted from the separating unit 7, "silent" information is outputted, whereas when the encoded signal of 8 Kbit/s is inputted therefrom, "active" information is outputted, while these "silent" information and "active" information are contained in the pseudo speech signal.

Next, the pseudo speech active judging unit 28 employed in the DCME 101 detects the above-explained active/silent information contained in the pseudo speech signal outputted from the pseudo speech signal producing unit 12 in DCME 102. When the active information is contained in the pseudo speech signal, the pseudo speech active judging unit 28 outputs "1" as a control signal to the transmission rate recovering unit 13. Conversely, when the silent information is contained in the pseudo speech signal, the pseudo speech active judging unit 28 outputs "0" as a control signal to the transmission rate recovering unit 13. The operation of this transmission rate recovering unit 13 will now be explained with reference to FIG. 3 which shows an internal arrangement of the transmission rate recovering unit 13.

Figure 3:
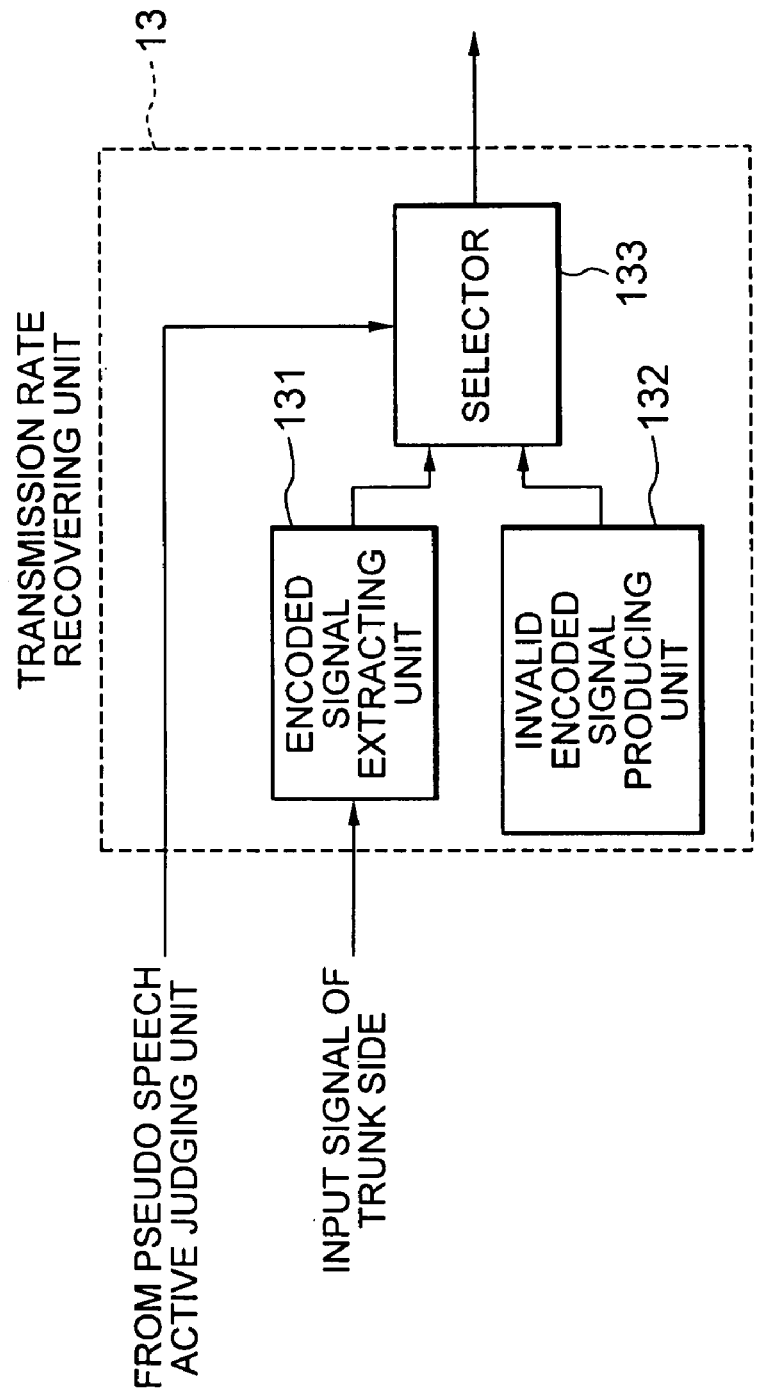
FIG. 3 is a schematic block diagram for indicating an internal arrangement of the transmission rate recovering unit 13 shown in FIG. 2.

That is, FIG. 3 is a block diagram showing the internal arrangement of the transmission rate recovering unit 13.

In FIG. 3, a encoded signal extracting unit 131 extracts the encoded signal of 8 Kbit/s from the entered pseudo speech signal to output the extracted encoded signal to the selector 133. Also, an invalid encoded signal producing unit 132 outputs such a encoded signal of 8 Kbit/s for indicating that this signal is invalid (will be referred to as an "invalid encoded signal" hereinafter). The encoded signal of 8 Kbit/s owns 80 bits per 1 DCME frame. For instance, this encoded signal may be defined as such a signal which represents that a signal whose all 80 bits are equal to "1" is invalid.

Also, both the speech encoding unit 3 and the first comfort noise generating unit 15 output encoded signals of 8 Kbit/s, whose all 80 bits are not necessarily equal to "1." The speech encoding algorithm is generally used CELP (Code Excited Linear Prediction) algorithm. In this CELP system, it is easy not to output such a signal whose all 80 bits become "1" based upon the following method. That is, since a specific parameter is vector-quantized and the code of this vector is contained in the code of this CELP system, such a vector whose all bits are equal to "1" is not previously used.

If the control signal supplied from the pseudo speech active judging unit 28 is equal to "1", then a selector 133 selects the output of the encoded data extracting unit 131 to output this selected data. If the control signal is equal to "0", then this selector 133 selects the output of the invalid encoded signal producing unit 132.

As a result, the operation of the transmission rate recovering unit 13 is carried out in accordance with the following manner. That is, in such a case that the active/silence information contained in the pseudo speech signal to be inputted is the active information, namely the speech encoded signal is actually contained in this pseudo speech signal, the transmission rate recovering unit 13 derives this speech encoded signal to be outputted. To the contrary, in such a case that the active/silence information contained in the pseudo speech signal to be inputted is the silent information, namely the speech encoded signal is not actually contained in this pseudo speech signal, the transmission rate recovering unit 13 derives this invalid encoded signal to be outputted.

The signal outputted from the above-described transmission rate recovering unit 13 is entered into the speech decoding unit 9 employed in the DCME (when this output signal is signal outputted from transmission rate recovering unit 13 employed in DCME 101, DCME 100 corresponds thereto) connected as the counter-party apparatus via the bearer circuit.

Figure 4:
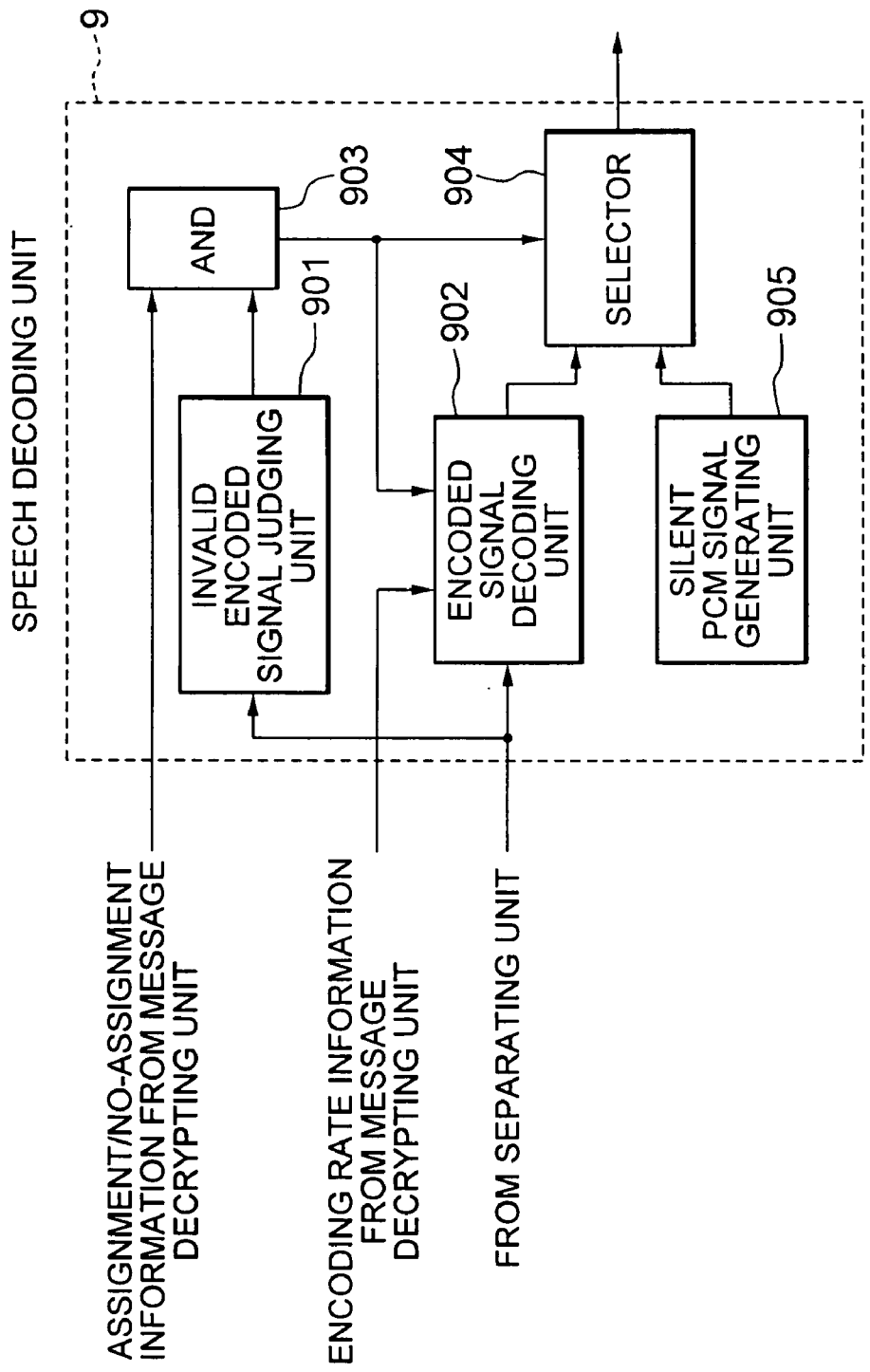
FIG. 4 is a schematic block diagram for showing an internal arrangement of the speech decoding unit 9 shown in FIG. 2.

FIG. 4 is a block diagram for indicating an internal arrangement of the speech decoding unit 9.

In FIG. 4, the encoded signal outputted from the separating unit 7 is entered into both an invalid encoded signal judging unit 901 and a encoded signal decoding unit 902. The invalid encoded signal judging unit 901 judges as to whether the entered signal corresponds to an invalid encoded signal outputted from the transmission rate recovering unit 13 employed in the DCME connected via the bearer circuit as the counter-party apparatus, or the normal encoded signal. When the input signal corresponds to such an invalid encoded signal, the invalid encoded signal judging unit 13 outputs "1" as the judgement result. Conversely, when the input signal corresponds to the normal encoded signal, this invalid encoded signal judging unit 901 outputs "0" to the AND gate circuit 903.

The AND gate circuit 903 AND-gates a bearer circuit assignment/no-assignment signal entered from the message decrypting unit 8 and the input signal supplied from the invalid encoded signal judging unit 901, and then outputs the AND-gated signal to both the encoded signal decoding unit 902 and the selector 904. The bearer circuit assignment/no-assignment signal becomes "0" when the corresponding channel of the trunk is assigned to the bearer circuit whereas the bearer circuit assignment/no-assignment signal becomes "1" when the corresponding channel of the trunk is not assigned to the bearer circuit. The encoded signal decoding unit 902 decodes either the encoded signal of 8 Kbit/s or the encoded signal of 40 Kbit/s, which are entered from the separating unit 7 based upon the encoding rate information entered from the message decrypting unit 8, and then supplies a PCM signal of 64 Kbit/s to a selector 904. When the signal entered from the AND gate circuit 903 becomes "1", the internal parameter is reset.

A silent PCM signal generating unit 905 generates either a silent signal or comfort noise having the PCM format of 64 Kbit/s. When the input signal from the AND gate circuit 903 becomes "0", the selector 9 selects the input signal supplied from the encoded signal decoding unit 902. When the input signal from the AND gate circuit 903 becomes "1", the selector 9 selects the input signal derived from the silent PCM signal generating unit 905. In other words, as to the operation of the speech decoding unit 9, in such a case that the input signal derived from the message decrypting unit is equal to "1" (namely, no bearer circuit assignment of this trunk channel), and also in such a case that the encoded signal entered from the separating unit 7 is the invalid encoded signal, the encoded signal decoding unit resets the internal parameter. Furthermore, the speech decoding unit 9 is operated in such a manner that the silent PCM signal is outputted. In other cases, this speech decoding unit 9 executes the normal speech decoding operation.

While the above-explained operation is carried out, with respect to the trunk channel number TCn under relay/connection, the bearer circuits are continuously assigned to both the DCME 101 and the DCME 102. Also, the bearer circuit assignment/no-assignment information of the TCn in the DCME 100 of FIG. 18 is mapped into the active/silence information contained in the pseudo speech signal by the pseudo speech signal producing unit 12 employed in the DCME 101 as the counter-party apparatus. Furthermore, this information is formed as the format of the normal encoded signal (namely, in case that bearer circuit is assigned) and also the format of the invalid-encoded signal (namely, in case that bearer circuit is not assigned) by the transmission rate recovering unit 13 of the DCME 102. Finally, both the normal encoded signal and the invalid encoded signal are transmitted to the speech decoding unit 9 of the DCME 103 so as to be reflected on resetting of the internal parameter. In other words, both the speech decoding device employed in the DCME 100 and the speech decoding device employed in the DCME 103 can be reset in the synchronous resetting mode.

As previously described in detail, in accordance with the DCME shown in FIG. 2, there is no such problem that the synchronous resetting operations of the speech decoding device and also of the speech decoding device cannot operate properly. Also, the tandem pass-through function can be realized without degrading the telephone communication quality.

It should also be noted that in the above-explained embodiment mode 3, the minimum code of the PCM code can be outputted as the PCM signal of "silent".

Embodiment Mode 4

In the above-explained description, such a signal whose all 80 bits are equal to "1" is used as an invalid encoded signal. In such a case that the speech encoding algorithm corresponds to the CELP system, while the below-mentioned encoded signal having a specific vector may be employed as an invalid encoded signal, the DCME may be operated in such a manner that this vector of the encoded signal is not used in the speech encoding unit 3. The use frequency of this vector is the minimum frequency when various sorts of speech signals are inputted among the vectors used in the CELP algorithm. There is a certain possibility that since a certain vector is not used by the speech encoding unit 3, a speech quality is slightly degraded. However, since such a vector whose use frequency is originally low is not used by the speech encoding unit 3, the degradation of the speech quality of this vector may be furthermore lowered.

Embodiment Mode 5

Also, while such a speech encoding algorithm that a encoded signal per a DCME frame owns 79 bits is employed, even when 1 bit for indicating as to whether the encoded signal is valid, or invalid is added to 79 bits to produce a signal having 80 bits as a encoded signal, a similar effect to that of the above-described embodiment mode may be achieved.

Embodiment Mode 6

Also, in the case that the speech encoding system corresponds to the CS-ACELP (Conjugate Structure Algebraic Code-Excited Linear Prediction) system defined in the ITU-T recommendation G.729, the parity bit is provided in the encoded signal in order to protect various sorts of parameter information. As a consequence, while this parity bit is used as a bit for indicating as to whether this encoded signal is valid, or invalid, when the normal (valid) encoded signal is used, the parity bit may be added thereto. When the invalid encoded signal is used, even if this parity bit may be inverted, then a similar effect to that of the above-described embodiment mode may be achieved.

Embodiment Mode 7

Also, in the case that the speech encoding system corresponds to the CS-ACELP (Conjugate Structure Algebraic Code-Excited Linear Prediction) system defined in the ITU-T recommendation G.729, the pitch (basic frequency) information parameter of the speech signal is contained in the encoded signal. When the speech signal is encoded, there is substantially no possibility that the lowest pitch is selected as this pitch information parameter. As a consequence, while this lowest pitch is not selected when the normal speech encoding operation is carried out, even if the encoded signal whose pitch information parameter becomes the lowest pitch is employed as the above-explained invalid encoded signal, a similar effect to that of the above-explained embodiment mode may be achieved.

Embodiment Mode 8

In the above-described embodiment modes 1 to 7, the descriptions are made of such an example that the encoding rate with respect to the telephone speech (voice) signal is 8 Kbit/s. Alternatively, other encoding rates may be employed. For instance, while the encoding rate with respect to the telephone speech signal is selected to be 32 Kbit/s, the following embodiment mode may be accomplished in the case that the ADPCM system defined in the ITU-T recommendation G.726 is employed as the encoding system. When the telephone speech signal is encoded by way of 32 Kbit/s-ADPCM system, the encoded speech signal is outputted as a 4-bit signal per 125 microseconds (namely, equal to 1 sampling time of PCM signal before being encoded). However, there is no definition about such an output signal whose all 4 bits become "1", and this output signal is unused. As a consequence, even when such a encoded signal containing encodes whose all bits per one sample are equal to "1" is used as the above-explained invalid encoded signal, a similar effect to that of the above-explained embodiment mode may be achieved. It should also be noted that as explained above, assuming now that the DCME frame length is 10 ms, the encoded signal for 1 DCME frame is equal to 320 bits (32,000 bits/second×0.01 second=320 bits). However, all of these 320 bits are not necessarily equal to "1", but 4 bits of a signal which constitutes 1 sample may be equal to "1."

Embodiment Mode 9

Also, as the PCM signal outputted from the silent PCM signal generating unit provided inside the speech decoding unit 9, Hoth spectrum noise may be used. The Hoth spectrum noise is a noise having such a noise characteristic that noise power in a certain frequency is higher than noise power at a two-times higher frequency than this first-mentioned frequency by 5 dB as a frequency amplitude characteristic thereof (−5 dB/Oct characteristic). This frequency characteristic of the Hoth spectrum noise is approximated to frequency characteristics of noise produced around persons who telephone-communicate with each other. The digital circuit multiplication equipment, according to this embodiment mode 9, can realize more natural telephone communications by employing such Hoth spectrum noise.

Embodiment Mode 10

Also, as the PCM signal outputted from the silent PCM signal generating unit provided inside the speech decoding unit 9, 1/f noise may be used. The 1/f noise is a noise having such a noise characteristic that noise power in a certain frequency is higher than noise power at a two-times higher frequency than this first-mentioned frequency by 6 dB as a frequency amplitude characteristic thereof (6 dB/Oct characteristic). This frequency characteristic of the 1/f noise is approximated to frequency characteristics of noise produced in the natural field. The digital circuit multiplication equipment, according to this embodiment mode 10, can realize more natural telephone communications by employing such Hoth spectrum noise.

Embodiment Mode 11

Also, in the case that the speech encoding algorithm corresponds to the 8 Kbit/s CS-ACELP system defined in the ITU-T recommendation G.729, instead of the comfort noise outputted from the silent PCM signal generating unit 905 employed within the speech decoding unit 9, the speech decoding unit may output a signal to which the frame erasure concealing process defined by the above-explained recommendation has been carried out. This frame erasure concealing process corresponds to such a solution process capable of avoiding the following problem. That is, when a bearer circuit is a wireless circuit, since there are many bit errors in the wireless circuit, a speech encoded signal will disappear. When this solution process is carried out, the speech signal which has disappeared may be predicted by employing the information before it disappeared, and then this predicted speech signal may be outputted. Also, when this process is operated in a continuous manner (over several frames), since the output signal may be approximated to "silent", this output signal may be used instead of the signal outputted from the silent PCM signal generating unit 905.

Embodiment Mode 12

Also, in the case that the speech encoding algorithm corresponds to the 16 Kbit/s LD-CELP system defined in the ITU-T recommendation G.728, instead of the comfort noise outputted from the silent PCM signal generating unit 905 employed within the speech decoding unit 9, the speech encoding unit may output a signal to which the frame erasure concealing process defined by the above-explained recommendation has been carried out. This frame erasure concealing process corresponds to such a solution process capable of solving the following problem. That is, when a bearer circuit is a wireless circuit or the like, since there are many bit errors in the wireless circuit, a speech encoded signal will disappear. When this solution process is carried out, the speech signal which has disappeared may be predicted by employing the information before it disappeared, and then this predicted speech signal may be outputted. Also, when this solution process is operated in a continuous manner (over several frames), since the output signal may be approximated to "silent", this output signal may be used instead of the signal outputted from the silent PCM signal generating unit 905.

Embodiment Mode 13

Figure 5:
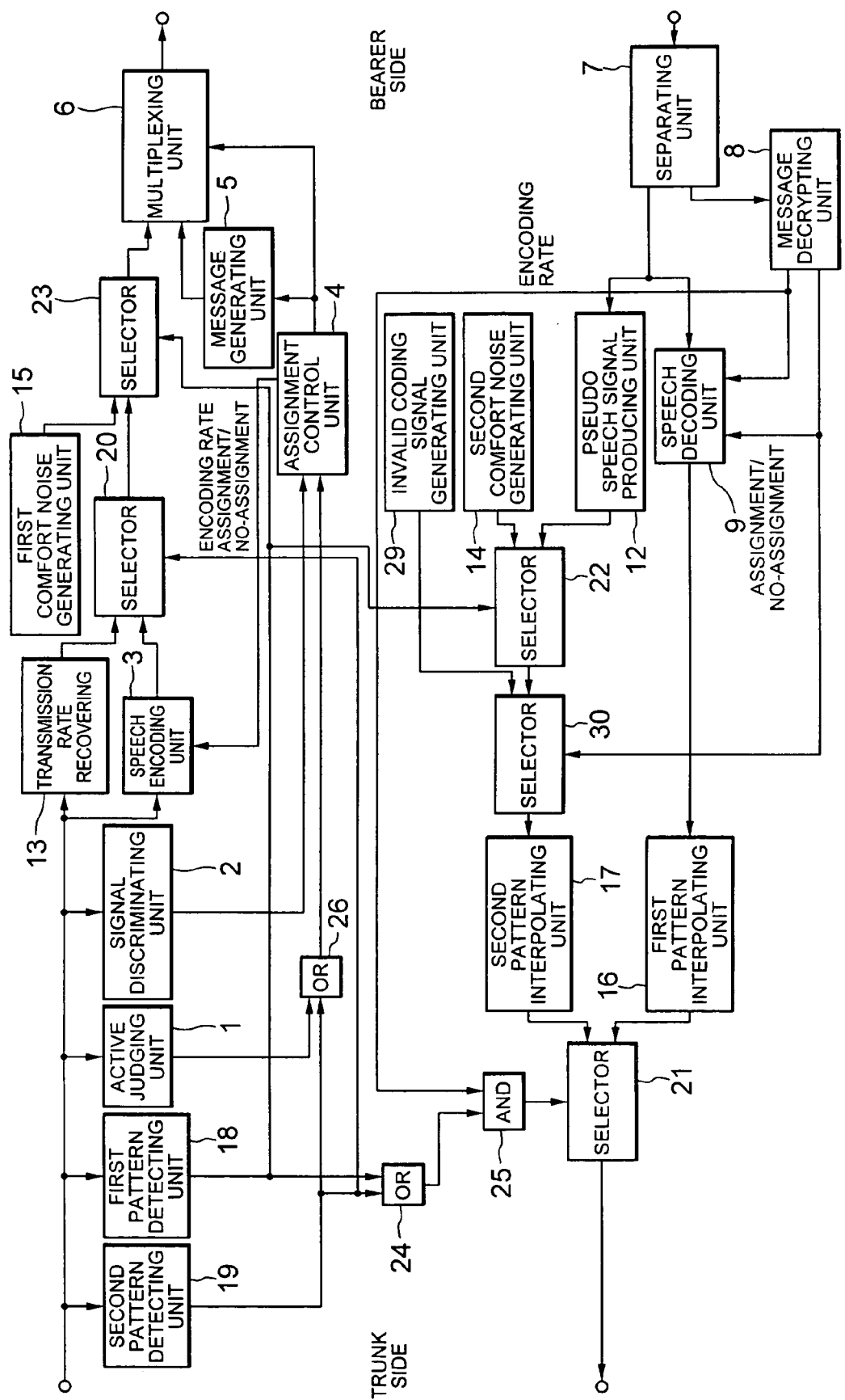
FIG. 5 is a schematic block diagram for showing an entire arrangement of a digital circuit multiplication equipment (DCME) according to an embodiment mode 13 of the present invention.

FIG. 5 is a block diagram for schematically representing an entire arrangement of a digital circuit multiplication equipment (DCME) according to an embodiment mode 13 of the present invention.

It should be noted that the same reference numerals shown in the embodiment mode 1 of FIG. 1 will be employed as those for indicating the same, or similar circuit units represented in FIG. 5, and explanations thereof are omitted. As a newly employed reference numeral, reference numeral 29 shows an invalid encoded signal producing unit. Reference numeral 30 is a selector.

Next, operations of the digital circuit multiplication equipment will be described.

In FIG. 5, a active judging unit 1, a signal discriminating unit 2, an assignment control unit 4, a multiplexing unit 6, a separating unit 7, a pseudo speech signal producing unit 12, a transmission rate recovering unit 13, a second comfort noise generating unit 14, a first comfort noise unit 15, a first pattern interpolating unit 16, a second pattern interpolating unit 17, a first pattern detecting unit 18, a second pattern detecting unit 19, a selector 20, a selector 21, a selector 22, a selector 23, and an OR gate circuit 24, and also an AND gate circuit 25 are operated in a similar manner to those of the DCME shown in FIG. 1. The message decrypting unit is operated in a similar manner to that of the DCME shown in FIG. 16. The speech decoding unit 9 is operated in a similar manner to that of the DCME shown in FIG. 2.

An invalid encoded signal generating unit 29 is operated in a similar manner to that of the invalid encoded signal generating unit 132 provided in the transmission rate recovering unit 13 shown in FIG. 3 so as to output an invalid encoded signal of 8 Kbit/s to the selector 30. As a result, the speech encoding unit 3 is operated in a similar manner to that of the speech encoding unit 3 employed in the DCME shown in FIG. 2 so as to execute a low-bit-rate encoding operation of a 64 Kbit/s PCM signal. When the encoding rate is selected to be 8 Kbit/s, the speech encoding unit 3 outputs a encoded signal other than the above-explained invalid encoded signal. In the case that the signal entered from the message decrypting unit 8 into the selector 30 is equal to "1" (namely, bearer circuit assignment of the corresponding trunk channel is not performed), this selector 30 selects the input signal derived from the invalid encoded signal producing unit 29. In the case that the signal entered from the message decrypting unit 8 into the selector 30 is equal to "0" (namely, bearer circuit assignment of the corresponding trunk channel is performed), this selector 30 selects the input signal derived from the selector 22, and then supplies the selected signal to the second pattern interpolating unit 17.

In the above-explained DCME shown in FIG. 2, the invalid encoded signal is outputted from the transmission rate recovering unit 13. This function is transmitted to the invalid encoded signal producing unit 29 in the DCME shown in FIG. 5. As a result, while the transmission rate-recovering unit 13 performs only the extraction of the encoded signal from the pseudo speech signal, other operations are carried out in a similar manner to those of the DCME shown in FIG. 2. Considering now operations with the connection mode indicated in FIG. 18, the bearer circuit assignment/no-assignment information of the trunk channel number TCn in the DCME 100 is obtained as any one of a pseudo speech signal which contains the normal encoded signal (namely, in case that bearer circuit assignment is performed), and another pseudo speech signal which contains an invalid encoded signal outputted from an invalid encoded signal producing unit 29 (in case that bearer circuit assignment is not performed). This normal encoded signal is outputted from the pseudo speech signal producing unit 12 in the DCME 101 which is connected as the counter-party apparatus via the bearer circuit. Either this normal encoded signal or the invalid encoded signal is extracted by the transmission rate recovering unit 13 employed in the DCME 102, and then the extracted signal is finally transmitted to the speech decoding unit 9 of the DCME 103, so that this transmitted signal is reflected on resetting of the internal parameter. In other words, the speech decoding device of the DCME 100 and the speech decoding device of the DCME 103 can be reset in the synchronous resetting mode.

As previously described, also in this embodiment mode 13, even when the tandem pass-through operation is carried out, such a DCME can be obtained by which the speech coding device and the speech decoding device can be reset in the synchronous resetting mode, which are located on both ends of the communication path of the DCME.

Embodiment Mode 14

Figure 6:
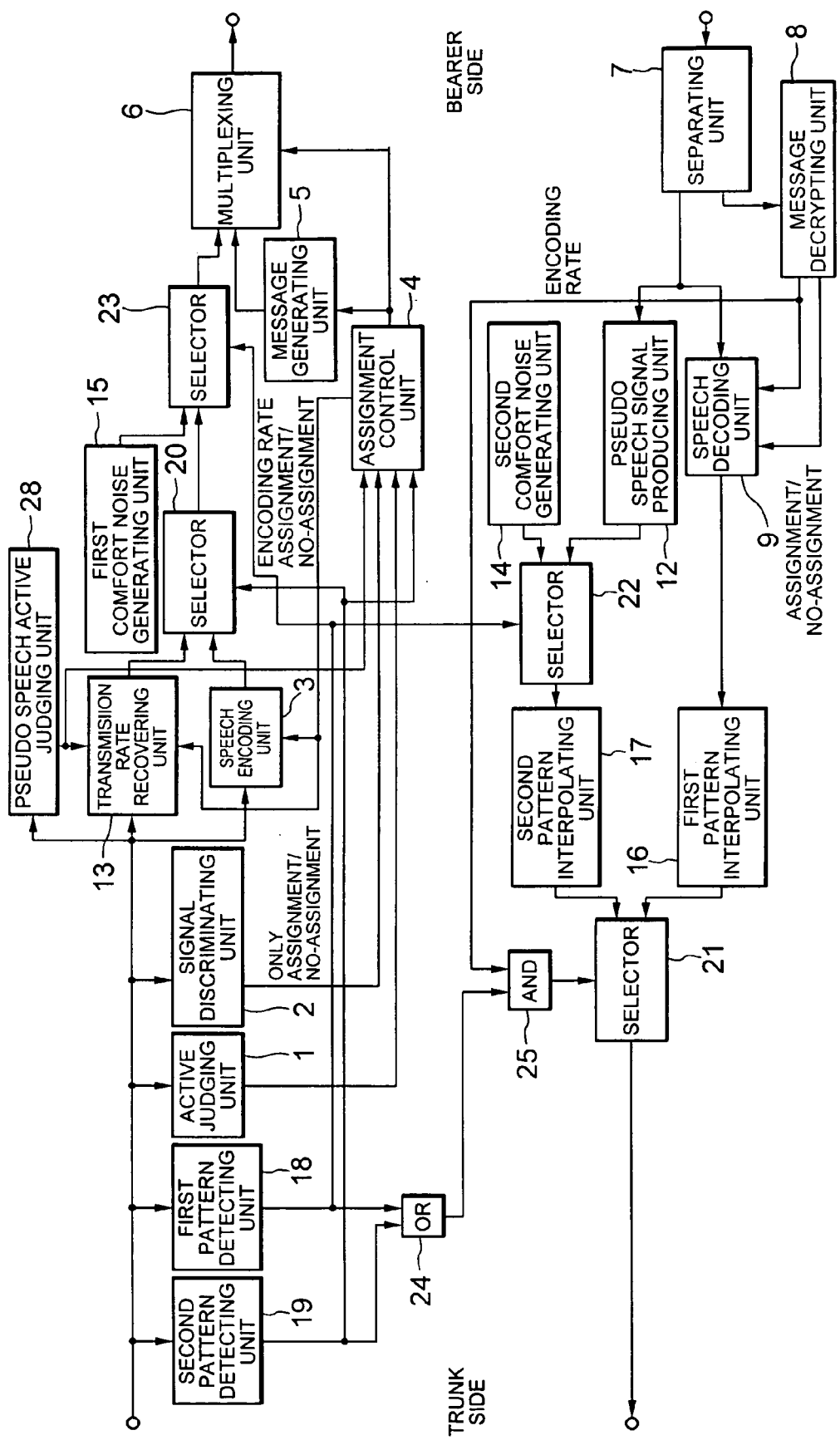
FIG. 6 is a schematic block diagram for representing an entire arrangement of a digital circuit multiplication equipment (DCME) according to an embodiment mode 14 of the present invention.

FIG. 6 is a block diagram for schematically representing an entire arrangement of a digital circuit multiplication equipment (DCME) according to an embodiment mode 14 of the present invention. It should be noted that the same reference numerals shown in the embodiment mode 3 of FIG. 2 will be employed as those for indicating the same, or similar circuit units represented in FIG. 6, and explanations thereof are omitted. In this embodiment mode 14, a different point is that operations of the assignment control unit 4 and the transmission rate recovering unit 13 in this embodiment mode 14 are different from those of the above-explained embodiment mode 3.

Next, operations of the digital circuit multiplication equipment (will be simply referred to as a "DCME" hereinafter) indicated in FIG. 6 will be described.

In FIG. 6, a active judging unit 1, a signal discriminating unit 2, a message producing unit 5, a multiplexing unit 6, a separating unit 7, a second comfort noise generating unit 14, a first comfort noise unit 15, a first pattern interpolating unit 16, a second pattern interpolating unit 17, a first pattern detecting unit 18, a second pattern detecting unit 19, a selector 20, a selector 21, a selector 22, a selector 23, and an OR gate circuit 24, and also an AND gate circuit 25 are operated in a similar manner to those of the DCME shown in FIG. 1. The speech encoding unit 3 is operated in a similar manner to that of the DCME shown in FIG. 2. While this speech encoding unit 3 performs the low-bit-rate encoding operation of the 64 Kbit/s PCM signal into either 8 Kbit/s PCM signal or 40 Kbit/s PCM signal, when the encoding rate is selected to be 8 Kbit/s, this speech encoding unit 3 outputs such a encoded signal other than a specific invalid encoded signal.

Also, the message decrypting unit 8 is operated in a similar manner to that of the conventional DCME indicated in FIG. 16. The speech decoding unit 9 is operated in a similar manner to that of the speech decoding unit 9 shown in FIG. 2. As a result, an internal arrangement diagram of this speech decoding unit 9 is represented in FIG. 4. Also, the pseudo speech signal producing unit 12 is operated in a similar manner to that of the DCME shown in FIG. 2. That is, the pseudo speech signal producing unit 12 is operated as follows: The active/silence information is added to the encoded signal of 8 Kbit/s entered from the separating unit 7, and dummy data is further added thereto, so that such a pseudo speech signal of 64 Kbit/s may be outputted from this pseudo speech signal producing unit 12. The pseudo speech signal active judging unit 28 is operated in a similar manner to that of the DCME shown in FIG. 2. That is, the pseudo speech active judging unit 28 detects the active/silence information contained in the pseudo speech signal. When the active information is contained in the pseudo speech signal, the pseudo speech active judging unit 28 outputs "1." Conversely, when the silent information is contained in the pseudo speech signal, the pseudo speech active judging unit 28 outputs "0."

As a new input signal, both the output signal of the second pattern detecting unit 19 and the output signal of the pseudo speech active judging unit 28, respectivley, are added to the assignment control unit 4. As to such a trunk channel that the input signal from the second pattern detecting unit 19 is equal to "0" (namely, second pattern no-detection state), the assignment control unit 4 employs the input signal supplied from the active judging unit 1 as the active/silence information of this trunk channel. As to such a trunk channel that the input signal from the second pattern detecting unit 19 is equal to "1" (namely, second pattern detection state), the assignment control unit 4 employs the input signal supplied from the pseudo speech active judging unit 28 as the active/silence information of this trunk channel. As to other operations, namely bearer circuit assignment operation, this assignment control unit 4 is operated in a similar manner to that of the DCME shown in FIG. 16. In other words with respect to such a trunk channel operated not under the pass-through operation (second pattern signal is not detected), the assignment control unit 4 performs a similar bearer circuit assigning operation to that of the conventional DCME. As to such a trunk channel operated under the pass-through operation (second pattern signal is detected), the assignment control unit 4 performs a bearer circuit assigning operation by employing the active/silence information contained in the pseudo speech signal.

Figure 7:
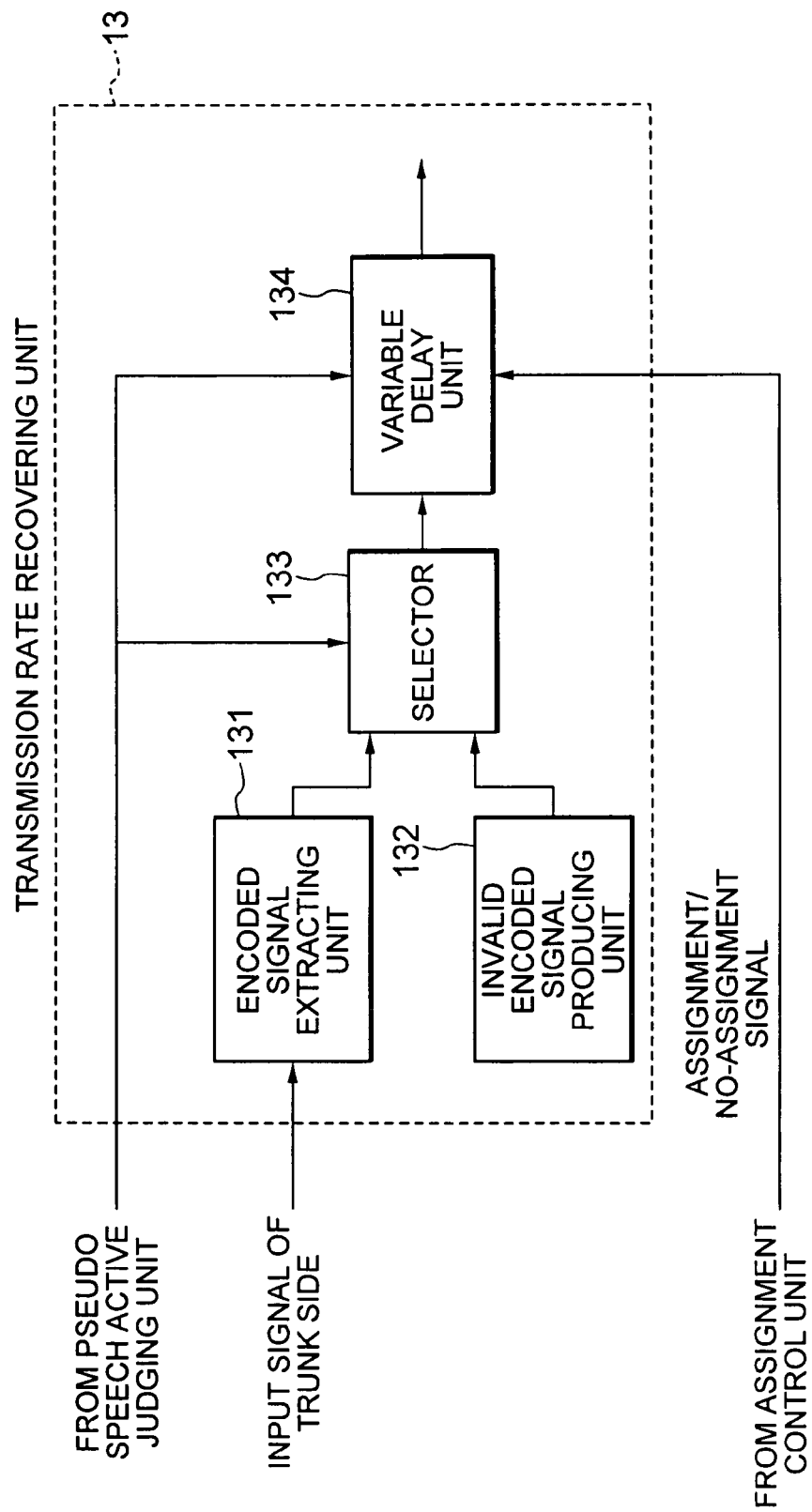
FIG. 7 is a schematic block diagram for indicating an internal arrangement of the transmission rate recovering unit 13 shown in FIG. 6.

In this embodiment mode 14, the transmission rate recovering unit 13 may execute the highly featured operation which will now be explained with reference to an internal structural diagram shown in FIG. 7.

The encoded signal extracting unit 131, the invalid encoded signal producing unit 132, and the selector 133 are operated in a similar manner to those of the above-described transmission rate recovering unit 13 indicated in FIG. 3. A variable DELAY unit 134 delays a signal entered from the selector 133 based upon both the active/silence information entered from the pseudo speech active judging unit 28 and the bearer circuit assignment/no-assignment information entered from the assignment control unit 4, so that such a encoded signal immediately after this input signal is changed from silent state into active state (namely, input signal is changed from invalid encoded signal into normal encoded signal) can be firmly outputted to the bearer circuit.

Concretely speaking, the transmission rate recovering unit 13 is operated as follows:

First, when the input signal supplied from the pseudo speech active judging unit 28 is changed from the "silent" state into the "active" state, and at the same time, when the input signal supplied from the assignment control unit 4 is changed from the "no-assignment" state into the "assignment" state (namely, when bearer circuit assignment is not delayed), the transmission rate recovering unit 13 directly outputs the input signal derived from the selector 133. On the other hand, when the input signal supplied from the pseudo speech active judging unit 28 is changed from the "silent" state into the "active" state, and at the same time, a delay is made in which the input signal supplied from the assignment control unit 4 is changed from the "no-assignment" state into the "assignment" state (namely, when bearer circuit assignment is delayed), the transmission rate recovering unit 13 stores thereinto the encoded signals entered from the selector 133 until the assignment operation to the bearer circuit is carried out. While such encoded signals are stored, the transmission rate recovering unit 13 is continued to output the invalid encoded signals which have been outputted just before the signal storage operation. Then, when the assignment operation to the bearer circuit is commenced, the transmission rate recovering unit 13 outputs the stored encoded signals in the order of the signal storage operations. In other words, this transmission rate recovering unit 13 delays the encoded signals by such a time period corresponding to the assignment operation to the bearer circuit, and then outputs the delayed encoded signals. In the case that the input signal from the pseudo speech active judging unit 28 is changed from the "active" state into the "silent" state, and thereafter the assignment operation to the bearer circuit is not performed, if the encoded signal has been delayed, then the transmission rate recovering unit 13 discards the encoded signals which have been delayed (or invalid encoded signals), and directly outputs the input signal supplied from the selector 133.

When the transmission rate recovering unit 13 is operated in accordance with the above-explained operating manner, the encoded signals appearing just after the input signal is changed from the "silent" state into the "active" state can be firmly transmitted to the bearer circuit.

In this case, as to the encoded signals appearing just after the input signal is changed from the "silent" state into the "active" state, if the assignment of the bearer circuit is removed at the same time when this signal is changed from the "active" state to the "silent" state, then the encoded signals which have been delayed are not transmitted to the bearer circuit, which may slightly deteriorate the telephone communication quality, but the deterioration is much smaller as compared with such a case that both the speech coding device and the speech decoding device cannot be reset in the synchronous resetting mode.

When the DCME operated in the above-described operation is applied to the DCME 100, the DCME 101, the DCME 102, and the DCME 103 shown in FIG. 18, even the trunk channel (TCn) operated under pass-through operation is operated in such a way that the encoded signals appearing just after the input signal is changed from the silent state into the active state can be firmly transmitted. As a consequence, in either the DCME 101 or the DCME 102, even when the assignment operation of the bearer circuit with respect to the trunk channel where the silent state is changed into the active state is delayed, both the speech decoding device in the DCME 100 and the speech decoding device in the DCME 103 can be reset in the synchronous resetting mode. Furthermore, since the bearer circuit assignment information used in the DCME 100 is used as the active/silence information in the assignment control unit 4 of the DCME 102, there is no need to continuously assignee the trunk channels operated under pass-through operation to the bearer circuit. As a consequence, the bearer circuits between the DCME 101 and the DCME 102 can be used more effectively, as compared with those of the DCMEs shown in the above-explained embodiment modes 1 to 13.

Embodiment Mode 15

Alternatively, in accordance with an embodiment mode 15 of the present invention, even when both the pseudo speech signal producing unit 12 and the transmission rate recovering unit 13 are changed into the below-mentioned arrangements, a similar effect to that of the DCME shown in the above-described embodiment mode 9 can be achieved.

Figure 8:
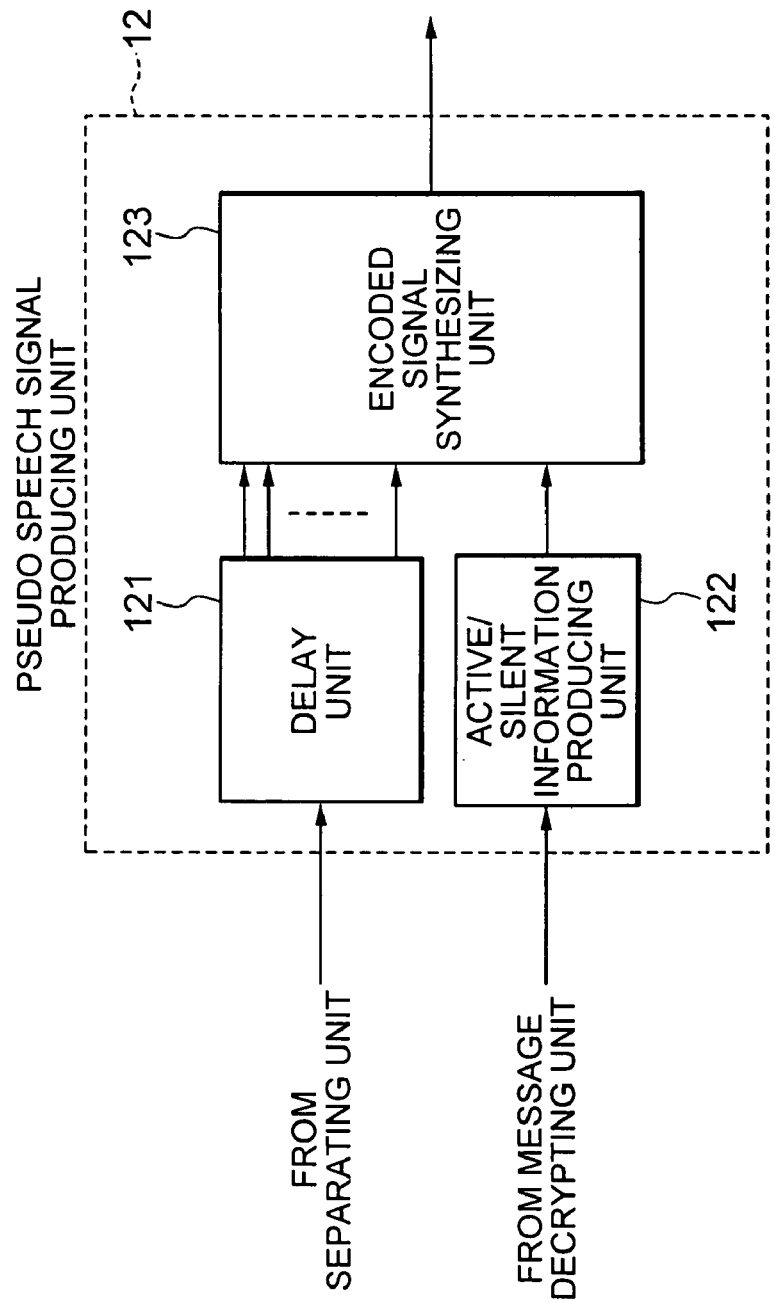
FIG. 8 is a schematic block diagram for showing an internal arrangement of the pseudo speech signal producing unit 12 employed in a digital circuit multiplication equipment according to an embodiment mode 15 of the present invention.

FIG. 8 is a block diagram for showing an internal arrangement of the pseudo speech signal producing unit 12 according to the embodiment mode 15. In this drawing, reference numeral 121 represents a DELAY unit for delaying a encoded signal of 8 Kbit/s, reference numeral 122 shows a active/silence information producing unit for producing active/silence information to be embedded in a pseudo speech signal, and reference numeral 123 represents a encoded signal synthesizing unit for synthesizing the encoded signal with the active/silence information to produce a pseudo speech signal of 64 Kbit/s.

Figure 9:
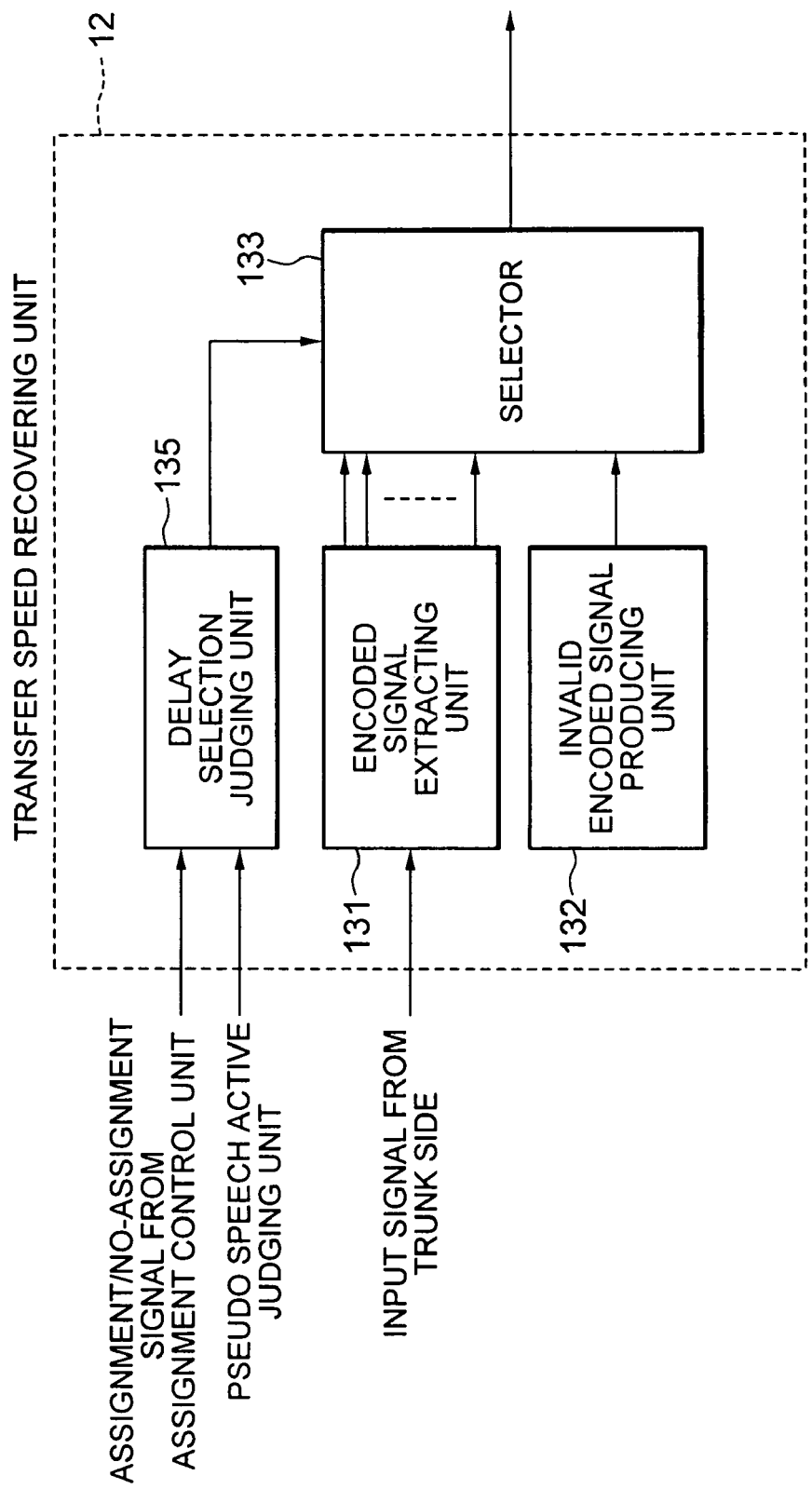
FIG. 9 is a schematic block diagram for indicating an internal arrangement of the transmission rate recovering unit 13 employed in the digital circuit multiplication equipment according to the embodiment mode 15 of the present invention.

Also, FIG. 9 is a block diagram for indicating an internal arrangement of the transmission rate recovering unit 13 according to this embodiment mode 15. In this drawing, reference numeral 131 shows a encoded signal extracting unit for extracting a encoded signal from a pseudo speech signal, reference numeral 132 shows an invalid encoded signal producing unit for producing an invalid encoded signal, reference numeral 133 represents a selector for selecting the encoded signal and the invalid encoded signal to output any one of these selected signals, and also reference numeral 134 indicates a delay selection judging unit for controlling operation of the selector 133.

First, operations of the pseudo speech signal producing unit 12 shown in FIG. 8 will now be explained.

The DELAY unit 121 continuously stores thereinto the 8 Kbit/s encoded signals entered from the separating unit 7 for 5 sets of past DCME-frames, and outputs all of these encoded signals corresponding to these 5 DCME-frames to the encoded signal synthesizing unit 123. The active/silence information producing unit 122 produces "active" information under bearer-line assignment state, and "silent" information under bearer-line no-assignment state based upon bearer-line assignment/no-assignment information entered from the message decrypting unit 8 to thereby output the sound and silent information to the encoded signal synthesizing unit 123.

The encoded signal synthesizing unit 123 adds dummy information of 16 Kbit/s to the encoded signals and the active/silence information so as to produce a pseudo encoded signal of 64 Kbit/s. The encoded signals are inputted from the DELAY unit 121 and correspond to 5 sets of the past DCME frames (since 5 DCME frames×8 Kbit/s, this encoded signal becomes 40 Kbit/s). The active/silence information is assumed as 8 Kbit/s, and is entered from the active/silence information producing unit 122. It should be noted that since a partial signal of this pseudo-speech signal is destroyed by interpolating the sound pattern by the second pattern interpolating unit 17, the encoded signal synthesizing unit 123 synthesizes the signals in such a manner that this signal portion to be destroyed may correspond to the above-explained dummy information.

Next, operations of the transmission rate recovering unit 13 shown in FIG. 9 will now be explained.

An invalid encoded signal producing unit 132 shown in FIG. 9 is operated in a similar manner to that of the invalid encoded signal unit 132 employed in the transmission rate recovering unit 13 shown in FIG. 3. The encoded signal extracting unit 131 inputs the pseudo speech signal, and extracts the encoded signals corresponding to 5 DCME frames, and then outputs the extracted encoded signals to the selector 133. Also, the selector 133 selects such encoded signals corresponding to 1 DCME frame among the encoded signals for the 5 DCME frames extracted from the encoded signal extracting unit 131, or the invalid encoded signal entered from the invalid encoded signal producing unit 132. Then this selector 133 outputs the selected signal to the selector 20.

The delay selection judging unit 135 outputs such a control signal to the selector 133 by determining a signal which is selected to the selector 133 based upon both the active/silence information entered from the pseudo speech active judging unit 28 and the bearer circuit assignment/no-assignment information entered from the assignment control unit 4, so that such a encoded signal immediately after the encoded signal is changed from silent state into active state (namely, encoded signal is changed from invalid encoded signal into normal encoded signal) can be firmly outputted to the bearer circuit.

For instance, when the input signal supplied from the pseudo speech active judging unit 28 is changed from the "silent" state into the "active" state, and at the same time, when the input signal supplied from the assignment control unit 4 is changed from the "no-assignment" state into the "assignment" state (namely, when bearer circuit assignment is not delayed), the delay selection judging unit 135 causes the selector 133 to select the latest encoded signal from the encoded signal extracting unit 131.

On the other hand, when the input signal supplied from the pseudo speech active judging unit 28 is changed from the "silent" state into the "active" state, and at the same time, a delay is made in which the input signal supplied from the assignment control unit 4 is changed from the "no-assignment" state into the "assignment" state (namely, when bearer circuit assignment is delayed), the delay selection judging unit 135 causes the selector 133 to select such an invalid encoded signal entered from the invalid encoded signal producing unit 132 while the assignment to the bearer circuit is carried out.

Then, when the assignment to the bearer circuit is commenced, the delay selection judging unit 135 causes the selector 133 to select the old encoded signals only for such a delay time period in the assignment to the bearer circuit among the encoded signals for the 5 DCME frames outputted by the encoded signal extracting unit 131. In the case that the input signal from the pseudo speech active judging unit 28 is changed from the "active" state into the "silent" state, and thereafter the assignment operation to the bearer circuit is not performed, the delay selection judging unit 135 causes the selector 133 to select the invalid encoded signal supplied from the invalid encoded signal producing unit 132.

When the transmission rate recovering unit 13 is operated in accordance with the above-explained operating manner, the encoded signals appeared just after the input signal is changed from the "silent" state into the "active" state can be firmly transmitted to the bearer circuit. In this case, as to the encoded signals appeared just after the input signal is changed from the "active" state into "silent" state, if the assignment operation of the bearer circuit is removed at the same time when this signal is changed from the "active" state to the "silent" state, then the encoded signals which have been delayed are not transmitted to the bearer circuit, in such a case that the old encoded signal is selected under the assignment state.

As previously described in detail, even when both the pseudo speech-signal producing unit 12 shown in FIG. 8 and the transmission rate recovering unit 13 shown in FIG. 9 are employed, the trunk channel (TCn) operated under pass-through operation is operated in such a way that the encoded signals appeared just after the input signal is changed from the silent state into the active state can be firmly transmitted. As a consequence, both the speech coding device and the speech decoding device can be reset in the synchronous resetting mode.

Embodiment Mode 16

Figure 10:
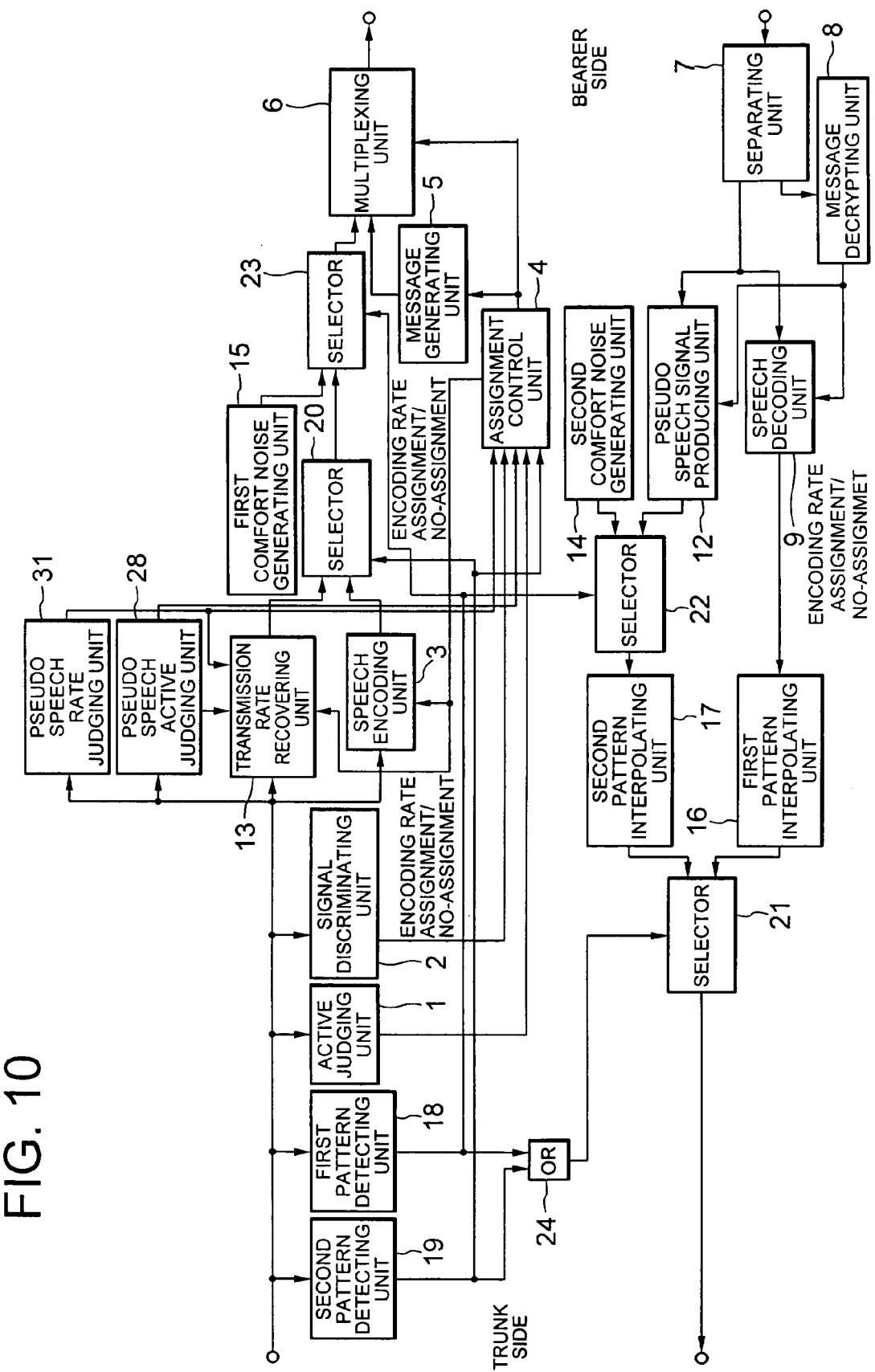
FIG. 10 is a schematic block diagram for showing an entire arrangement of a digital circuit multiplication equipment (DCME) according to an embodiment mode 16 of the present invention.

FIG. 10 is a block diagram for schematically representing an entire arrangement of a digital circuit multiplication equipment (DCME) according to an embodiment mode 16 of the present invention. It should be noted that the same reference numerals shown in the embodiment mode 14 of FIG. 6 will be employed as those for indicating the same, or similar circuit units represented in FIG. 10, and explanations thereof are omitted. As a newly employed reference numeral, reference numeral 31 shows a pseudo speech rate judging unit.

Next, operations of the digital circuit multiplication equipment (will be simply referred to as a "DCME" hereinafter) indicated in FIG. 10 will now be described.

In FIG. 10, a active judging unit 1, a signal discriminating unit 2, a message producing unit 5, a multiplexing unit 6, a separating-unit 7, a second comfort noise generating unit 14, a first comfort noise unit 15, a first pattern interpolating unit 16, a second pattern interpolating unit 17, a first pattern detecting unit 18, a second pattern detecting unit 19, a selector 20, a selector 21, a selector 22, a selector 23, and also an OR gate circuit 24 are operated in a similar manner to those of the DCME shown in FIG. 1. The speech encoding unit 3 is operated in a similar manner to that of the DCME shown in FIG. 2. This speech encoding unit 3 performs a low-bit-rate encoding operation of a 64 Kbit/s PCM signal into either an 8 Kbit/s PCM signal or a 40 Kbit/s PCM signal in a similar manner to that of the DCME shown in FIG. 2. When the encoding rate is selected to 8 Kbit/s, the speech encoding unit 3 outputs such a encoded signal other than a specific encoded signal.

Also, the message decrypting unit 8 is operated in a similar manner to that of the conventional DCME indicated in FIG. 16. The speech decoding unit 9 is operated in a similar manner to that of the speech decoding unit 9 shown in FIG. 2. As a result, an internal arrangement diagram of this speech decoding unit 9 is represented in FIG. 4. Also, the pseudo speech signal active judging unit 28 is operated in a similar manner to that of the DCME shown in FIG. 2. That is, the pseudo speech active judging unit 28 detects the active/silence information contained in the pseudo speech signal. When the active information is contained in the pseudo speech signal, the pseudo speech active judging unit 28 outputs "1." Conversely, when the silent information is contained in the pseudo speech signal, the pseudo speech active judging unit 28 outputs "0."

Figure 11:
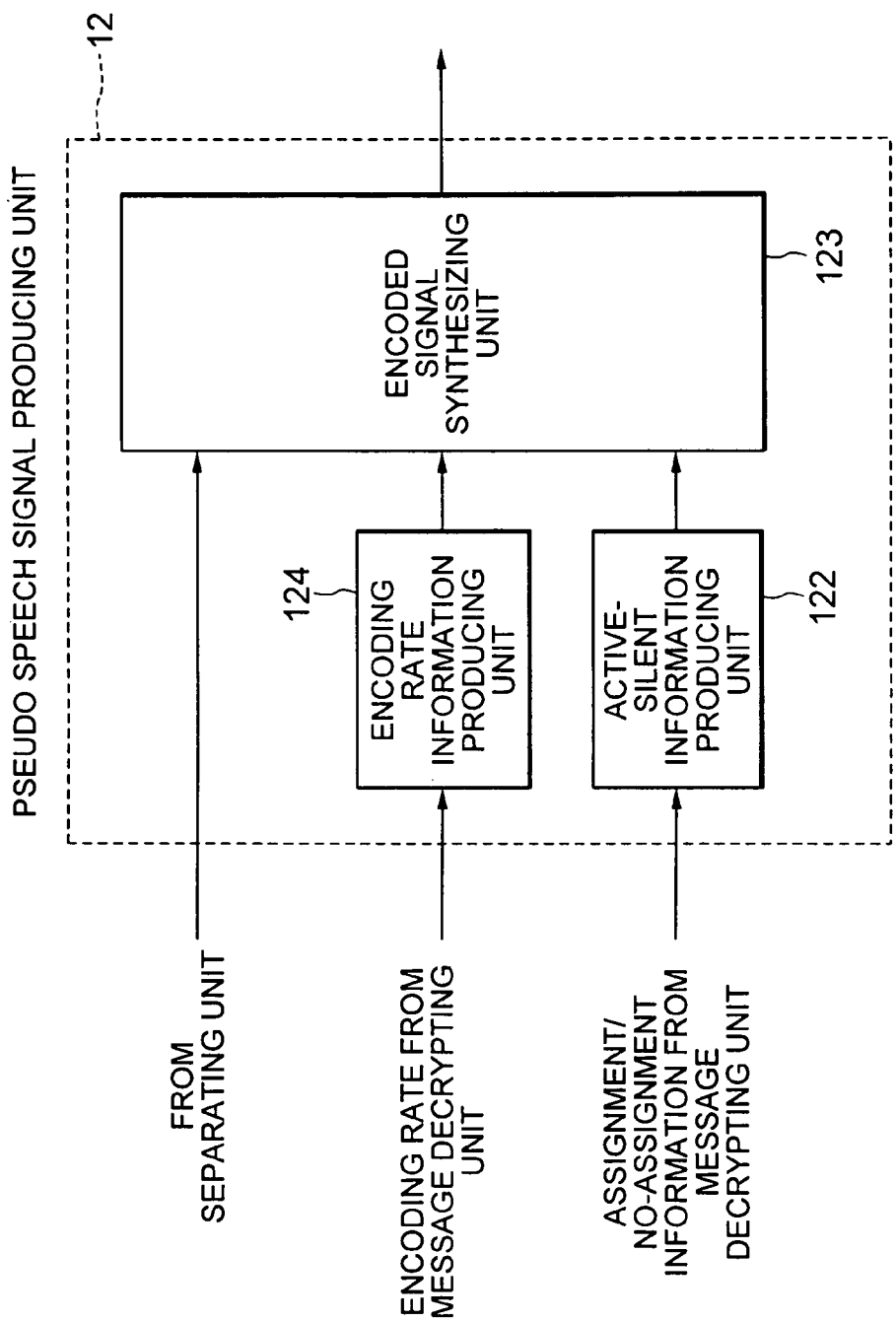
FIG. 11 is a schematic block diagram for indicating an internal arrangement of the pseudo speech signal producing unit 12 shown in FIG. 10.

Operations of the pseudo speech signal producing unit 12 will now be explained with reference to an internal arrangement diagram of FIG. 11. In FIG. 11, reference numeral 124 shows a encoding rate information producing unit for producing encoding rate information which is embedded in a pseudo speech signal. In this drawing, a active/silence information producing unit 122 produces "active" information under bearer-line assignment state, and "silent" information under bearer-line no-assignment state based upon bearer-line assignment/no-assignment information entered from the message decrypting unit 8 to thereby output the sound and silent information to the encoded signal synthesizing unit 123.

Based upon the encoding rate information entered from the message decrypting unit 8, the encoding rate information producing unit 124 produces such encoding rate information which is embedded into the pseudo speech signal. The encoded signal synthesizing unit 123 adds dummy information to the encoded signal of either 8 Kbit/s or 40 Kbit/s entered from the separating unit 7, the active/silence information inputted from the active/silence information producing unit 122, and also the encoding rate information inputted from the encoding rate information producing unit 124, so that a pseudo encoded signal of 64 Kbit/s is produced to be outputted. It should be noted that since a partial signal of this pseudo speech signal is destroyed by interpolating the second pattern by the second pattern interpolating unit 17, the encoded signal synthesizing unit 123 synthesizes the signals in such a manner that this signal portion to be destroyed may correspond to the above-explained dummy information.

As previously explained, since the encoding rate information is contained in the pseudo speech signal, the pseudo speech rate judging unit 31 extracts this encoding rate information. When the extracted encoding rate information is 8 Kbit/s, this pseudo speech rate judging unit 31 outputs such a control signal of "0", whereas when the extracted encoding rate information is 40 Kbit/s, this pseudo speech rate judging unit 31 outputs such a control signal of "1".

The output signal from the pseudo speech rate judging unit 31, the output signal of the second pattern detecting unit 19, and the output signal of the pseudo speech active judging unit 28 are entered to the assignment control unit 4, respectively. As to such a trunk channel that the input signal from the second pattern detecting unit 19 is equal to "0" (namely, second pattern no-detection state), the assignment control unit 4 employs the input signal supplied from the active judging unit 1 as the active/silence information of this trunk channel, and also the assignment control unit 4 employs the input signal from the signal discriminating unit 2 as the signal discrimination information. As to such a trunk channel that the input signal from the second pattern detecting unit 19 is equal to "1" (namely, second pattern detection state), the assignment control unit 4 employs the input signal supplied from the pseudo speech active judging unit 28 as the active/silence information of this trunk channel. Furthermore, the assignment control unit 4 judges the input signal as the speech when the encoding rate information derived from the pseudo speech rate judging unit 31 is 8 Kbit/s, and also judges the input signal as the voice-band data when this encoding rate information is 40 Kbit/s as the signal discrimination signal. As to other operations, namely bearer circuit assignment operation, this assignment control unit 4 is operated in a similar manner to that of the DCME shown in FIG. 16.

In other words, with respect to such a trunk channel operated not under the pass-through operation (second pattern signal is not detected), the assignment control unit 4 performs a similar bearer circuit assigning operation to that of the conventional DCME. As to such a trunk channel operated under the pass-through operation (second pattern signal is detected), the assignment control unit 4 performs a bearer circuit assigning operation by employing the active/silence information contained in the pseudo speech signal, and the encoding rate information.

Figure 12:
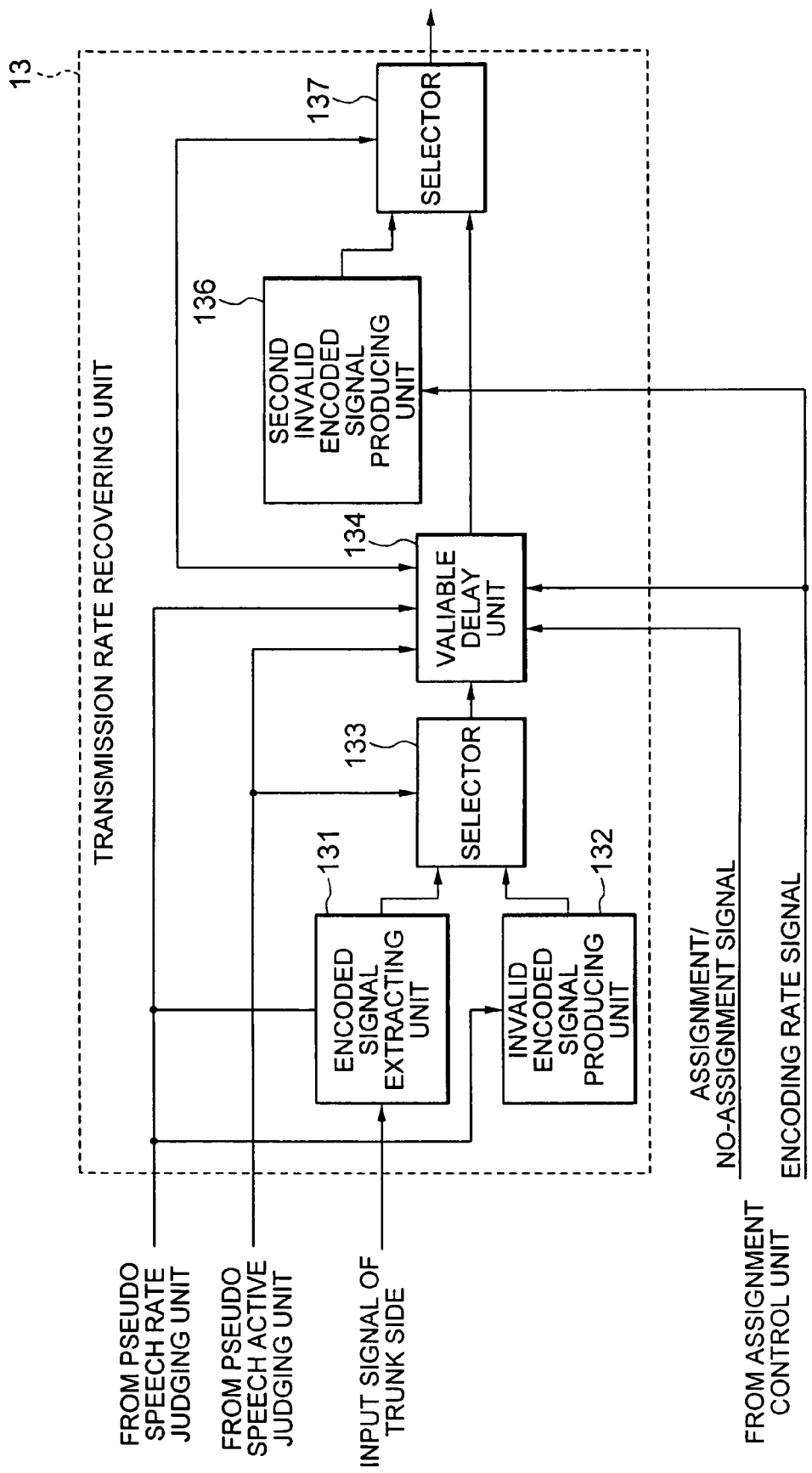
FIG. 12 is a schematic block diagram for showing an internal arrangement of the transmission rate recovering unit 13 shown in FIG. 10.

The transmission rate recovering unit 13 will now be explained with reference to an internal structural diagram shown in FIG. 12. In FIG. 12, reference numeral 135 shows a second invalid encoded signal producing unit for producing an invalid encoded signal, and reference numeral 136 represents a selector.

First, in FIG. 12, the encoded signal extracting unit 131 extracts either the 8 Kbit/s encoded signal or the 40 Kbit/s encoded signal from the pseudo speech signal entered from the trunk side in accordance with the encoding rate information derived from the pseudo speech rate judging unit 31, and then outputs the extracted encoded signal to the selector 133. In accordance with the encoding rate information supplied from the pseudo speech rate judging unit 31, the invalid encoded signal producing unit 132 produces either an 8 Kbit/s invalid encoded signal or a 40 Kbit/s invalid encoded signal to output the produced invalid encoded signal to the selector 133.

In this case, as to the output operation of the invalid encoded signal in the case of 8 Kbit/s, this invalid encoded signal producing unit 132 is operated in a similar manner to that of the invalid encoded signal producing unit 132 employed in the transmission rate recovering unit 13 shown in FIG. 3. As to the 40 Kbit/s invalid encoded signal, in such a case that this speech encoding system corresponds to the ADPCM system defined in the ITU-T recommendation G.766, the invalid encoded signal producing unit 132 outputs as the encoded signal a 5-bit-signal per 125 microseconds. There is no possibility that all of 5 bits are equal to "1." As a result, for example, such a signal whose all 400 bits are equal to "1" may be used as the invalid encoded signal (total bit number of 40 Kbit/s encoded signal is equal to 400 bits=40000 bits/second×0.01 second).

In response to the input signal supplied from the pseudo speech active judging unit 28, the selector 133 selects the input signal derived from the encoded signal extracting unit 131 when this judgement input signal is equal to "1", namely "active", whereas the selector 133 selects the input signal derived from the invalid encoded signal producing unit 132 when this judgement input signal is equal to "0", namely "silent." Then, this selector 133 outputs the selected signal to the variable DELAY unit 134. Also, the second encoded signal producing unit 135 is operated in a similar manner to that of the invalid encoded signal producing unit 132, and outputs either 8 Kbit/s invalid encoded signal or 40 Kbit/s invalid encoded signal based upon the encoding rate information derived from the assignment control unit 4. In response to a control signal supplied from the variable DELAY unit 134, the selector 137 selects the input signal derived from the variable DELAY unit 134 when this control signal is equal to "0." Also, in response to a control signal supplied from the variable DELAY unit 134, the selector 137 selects the input signal derived from the second invalid encoded signal producing unit 136 when this control signal is equal to "1."

Next, operations of the variable DELAY unit 134 will now be explained.

The variable DELAY unit 134 delays the signal entered from the selector 133 based upon the active/silence information entered from the pseudo speech active judging unit 28, the bearer circuit assignment/no-assignment information and the assignment rate information, which are entered from the assignment control unit 4, and also the encoding rate information entered from the pseudo speech rate judging unit 31. As a result, the encoded signals appeared just after this input signal is changed from the silent state into the active state (namely, input signal is changed from invalid encoded signal into normal encoded signal), and also just immediately after the encoding rate is changed can be firmly outputted to the bearer circuit.

First, the following case will now be considered. That is, there is no change in both the encoding rate information of the pseudo speech signal and also the bearer circuit assignment rate. In principle, the bearer circuit assignment rate is not changed unless the encoding rate of the pseudo speech signal is changed.

When the input signal supplied from the pseudo speech active judging unit 28 is changed from the "silent" state into the "active" state, and at the same time, when the input signal supplied from the assignment control unit 4 is changed from the "no-assignment" state into the "assignment" state (namely, when bearer circuit assignment is not delayed), the variable DELAY unit 134 directly outputs the input signal derived from the selector 133.

On the other hand, when the input signal supplied from the pseudo speech active judging unit 28 is changed from the "silent" state into the "active" state, and at the same time, a delay is made in which the input signal supplied from the assignment control unit 4 is changed from the "no-assignment" state into the "assignment" state (namely, when bearer circuit assignment is delayed), the variable DELAY unit 134 stores thereinto the encoded signals entered from the selector 133 until the assignment operation to the bearer circuit is carried out. While such encoded signals are stored, the variable DELAY unit 134 is continued to output the invalid encoded signals which have been outputted just before the signal storage operation. Then, when the assignment operation to the bearer circuit is commenced, the variable DELAY unit 134 outputs the stored encoded signals in the order of the signal storage operations.

In other words, this variable DELAY unit 134 delays the encoded signals by such a time period corresponding to the assignment operation to the bearer circuit, and then outputs the delayed encoded signals.

In the case that the input signal from the pseudo speech active judging unit 28 is changed from the "active" state into the "silent"state, and thereafter the assignment of the trunk channel to the bearer circuit is not removed, if the encoded signal has been delayed, then the variable DELAY unit 134 discards the encoded signals which have been delayed (or invalid encoded signals), and directly outputs the input signal supplied from the selector 133.

When the variable DELAY unit 134 is operated in accordance with the above-explained operating manner, the encoded signals appeared just after the input signal is changed from the "silent" state into the "active" state can be firmly transmitted to the bearer circuit. In this case, as to the encoded signals appeared just after the input signal is changed from the "active" state into "silent" state, if the assignment of the trunk channel to the bearer circuit is removed at the same time when this signal is changed from the "active" state to the "silent" state, then the encoded signals which have been delayed are not transmitted to the bearer circuit. It should also be noted that when there is no change in the encoding rate, as explained above, such a control signal of "0" is continuously outputted to the selector 137. As a consequence, the selector 137 continuously selects the output signal of the variable DELAY unit 134 to output this selected signal.

Next, the following case will now be considered. That is, the encoding rate of the pseudo speech signal is changed. As a result, the assignment rate of the bearer circuit is changed (there is no possibility that this encoding rate information is not changed in case of "silent").

In such a case that both the encoding rate of the pseudo speech signal and the assignment rate of the bearer circuit are changed at the same time (namely, bearer circuit assignment change not delayed), the variable DELAY unit 134 directly outputs the input signal entered from the selector 133 without delaying this input signal irrespective of such a fact as to whether or not the input signal entered from the selector 133 has been delayed in this variable DELAY unit. Then, a control signal outputted to the selector 137 is equal to "0" (namely, output of variable DELAY unit 134 is selected).

Also, another case is considered in which while the encoding rate change of the pseudo speech signal is changed, the assignment rate of the bearer circuit is delayed. First, until the assignment rate of the bearer circuit is changed, if such a encoded signal which has not yet been outputted before the encoding rate is changed is left in the variable DELAY unit 134, then this remaining encoded signal is outputted. If not, then while the control signal to be outputted to the selector 137 is set to "1", the output of the second invalid encoded signal producing unit 136 is selected to be outputted. It should be understood that at this time, the second invalid encoded signal producing unit 136 outputs such an invalid encoded signal in response to the assignment rate supplied from the assignment control unit 4. Also, the variable DELAY unit 134 stores thereinto the input signal derived from the selector 133.

Thereafter, when the assignment rate of the bearer circuit is changed, the variable DELAY unit 134 returns the control signal outputted to the selector 137 to "0", and at the same time, sequentially outputs the encoded signals which have been inputted from the selector 133 to be stored thereinto from such a encoded signal appeared just after the encoding rate is changed. Then, if the encoded signals appeared before the encoding rate is changed, then the variable DELAY unit 134 discards all of these remaining encoded signals.

As previously explained, such a encoded signal appeared just after the encoding rate is changed may be firmly outputted to the bearer circuit.

Since the DCME shown in FIG. 10 is operated in the above-described operation, both the 8 Kbit/s encoded signal and 40 Kbit/s encoded signal can be transmitted by way of the tandem pass-through operation. Also, when the encoded signal is changed from "silent" state into "active" state (namely, in bearer circuit connected from DCME 100 to DCME 101 in FIG. 18, the state is changed from "no-assignment" state into "assignment" state), both the encoded signal just after this change of the sound and the encoded signal just after the encoding rate are changed can be firmly transmitted by way of the tandem pass-through operation.

As a result, in accordance with the DCME shown in FIG. 10, even when the tandem pass-through operation is carried out, the speech coding device and the speech decoding device of the DCME, which are located on both ends of the transmit path, can be reset in the synchronous resetting mode.

Embodiment Mode 17

Figure 13:
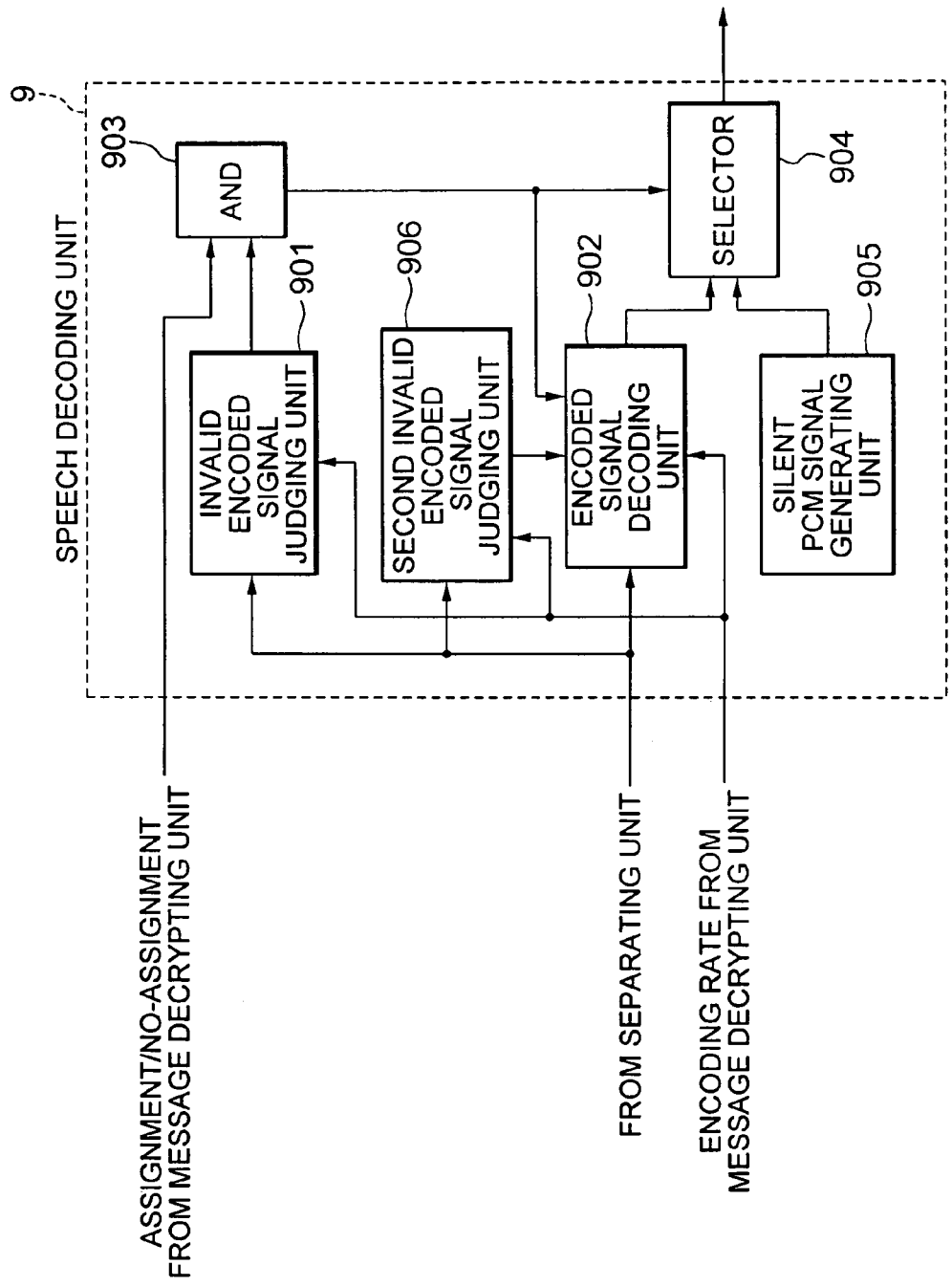
FIG. 13 is a schematic block diagram for indicating an internal arrangement of the speech decoding unit 9 employed in a digital circuit multiplication equipment according to an embodiment mode 17 of the present invention.

Alternatively, the invalid encoded signal outputted from the second invalid encoded signal producing unit 136 employed in the transmission rate recovering unit 13 shown in FIG. 12 may be made different from the invalid encoded signal outputted from the invalid encoded signal producing unit 132. In other words, two different sorts of invalid encoded signal may be defined. In this alternative case, an internal arrangement of the speech decoding unit 9 is indicated in FIG. 13. In FIG. 13, as a new reference numeral, reference numeral 906 shows a second invalid encoded signal judging unit.

Next, a description will now be made of operation of the speech decoding unit 9.

It should be understood in the below-mentioned description that as to two different sorts of invalid encoded signals, the signal produced from the invalid encoded signal producing unit 132 shown in FIG. 12 will be referred to as a first invalid encoded signal, whereas a signal outputted from the second invalid encoded signal judging unit 906 will be referred to as a second invalid encoded signal. In FIG. 13, the invalid encoded signal judging unit 901, an AND gate circuit 903, a selector 904, and a silent PCM signal generating unit 905 are operated in a similar manner to those of the speech decoding unit 9 shown in FIG. 4. The second invalid encoded signal judging unit 906 inputs thereinto either the 8 Kbit/s encoded signal or the 40 Kbit/s encoded signal from the separating unit 7, and judges as to whether or not this input encoded signal corresponds to the second invalid encoded signal. Then, the second invalid encoded signal judging unit 906 outputs the judgment result to the encoded signal decoding unit 902.

In the case that the judgment result entered from the second invalid encoded signal judging unit 906 is not equal to the second invalid encoded signal, this encoded signal decoding unit 902 is operated in a similar manner to that of the encoded signal decoding unit 902 employed in the speech decoding unit 9 shown in FIG. 4. Conversely, in the case that the judgment result entered from the second invalid encoded signal judging unit 906 is equal to the second invalid encoded signal, this encoded signal decoding unit 902 outputs a new PCM signal predicted from the states up to the previous DCME frame. As this signal, for instance, the output signal of the previous DCME frame may be directly outputted. Also, in such a case that the speech encoding algorithm corresponds to the CS-ACELP system defined in the ITU-T recommendation G.729, or the LD-CELP system defined in the ITU-T recommendation G.728, the encoded signal decoding unit 902 may execute the frame erasure concealing process operation defined in the recommendation G.728/G.729, to output a prediction signal.

As apparent from the foregoing description made in connection with the embodiment mode 11, in the case that there is no signal which should pass through the DCME (namely, "silent" information of active/silence information contained in pseudo speech signal), the above-described first invalid encoded signal is outputted from the transmission rate recovering unit 28 when the encoding rate of the second invalid encoded signal is changed. As a result, the speech decoding unit 9 outputs the silent signal in the case of the "silent" state, and outputs the prediction signal when the encoding rate is switched in correspondence with this recovering operation. In the embodiment mode 11, the speech decoding unit 902 outputs the silent signal in any case. Since switching of the encoding rate is performed under active state, it is better for the speech decoding unit 9 that the prediction signal is outputted when the encoding rate is switched, which may produce more natural signals with respect to the telephone communication party. The reason why switching of the encoding rate is performed under active state is given as follows; Under such a condition that the input signal appears under "silent" state, the signal discriminating unit 2 can hardly discriminate the sort of this input signal.

As previously described, in accordance with the DCME of the embodiment mode 17, while the tandem pass-through operation is carried out, the speech coding device and the speech decoding device of the DCME, which are located on both ends of the transmit path, can be reset in the synchronous resetting mode. Also, even when the encoding rate is switched, the DCME can reproduce such telephone communication signals which may cause the communication party to have more natural feelings.

It should also be noted that as the above-explained second invalid encoded signal, the below-mentioned encoded signal may be employed.

In such a case that the speech encoding system corresponds to the ADPCM system defined in the ITU-T recommendation G.726, such a encoded signal which is not defined by this ITU-T recommendation may be used as the above-explained second invalid signal. This encoded signal contains such encodes for 1 sample, all of which are equal to "1."

In such a case that the speech encoding system corresponds to the CELP system, such a encoded signal may be used as the above-explained second invalid signal. This encoded signal contains vectors, the use frequency of which is low when the speech signal is inputted into the encoding device thereof.

In such a case that the speech encoding system corresponds to the CS-ACELP system defined in the ITU-T recommendation G.729, such a encoded signal which is defined by this ITU-T recommendation may be used as the above-explained second invalid signal. In this encoded signal, the parity bit for protecting the parameter information becomes error.

In such a case that the speech encoding system corresponds to the CS-ACELP system defined in the ITU-T recommendation G.729, such a encoded signal may be used as the above-explained second invalid signal. This encoded signal is made by that the pitch period information contained in this encoded signal which is used as the lowest period.

Furthermore, in the above-describe embodiment mode, when the assignment rate of the bearer circuit is made faster than the speech encoding rate, a difference between these rates may be assigned to such information indicative of the first invalid encoded signal, the second invalid encoded signal, or the normal encoded signal.

Alternatively, the signal which has been outputted from the speech decoding device in the past may be employed as the prediction PCM signal.

Embodiment Mode 18

Figure 14:
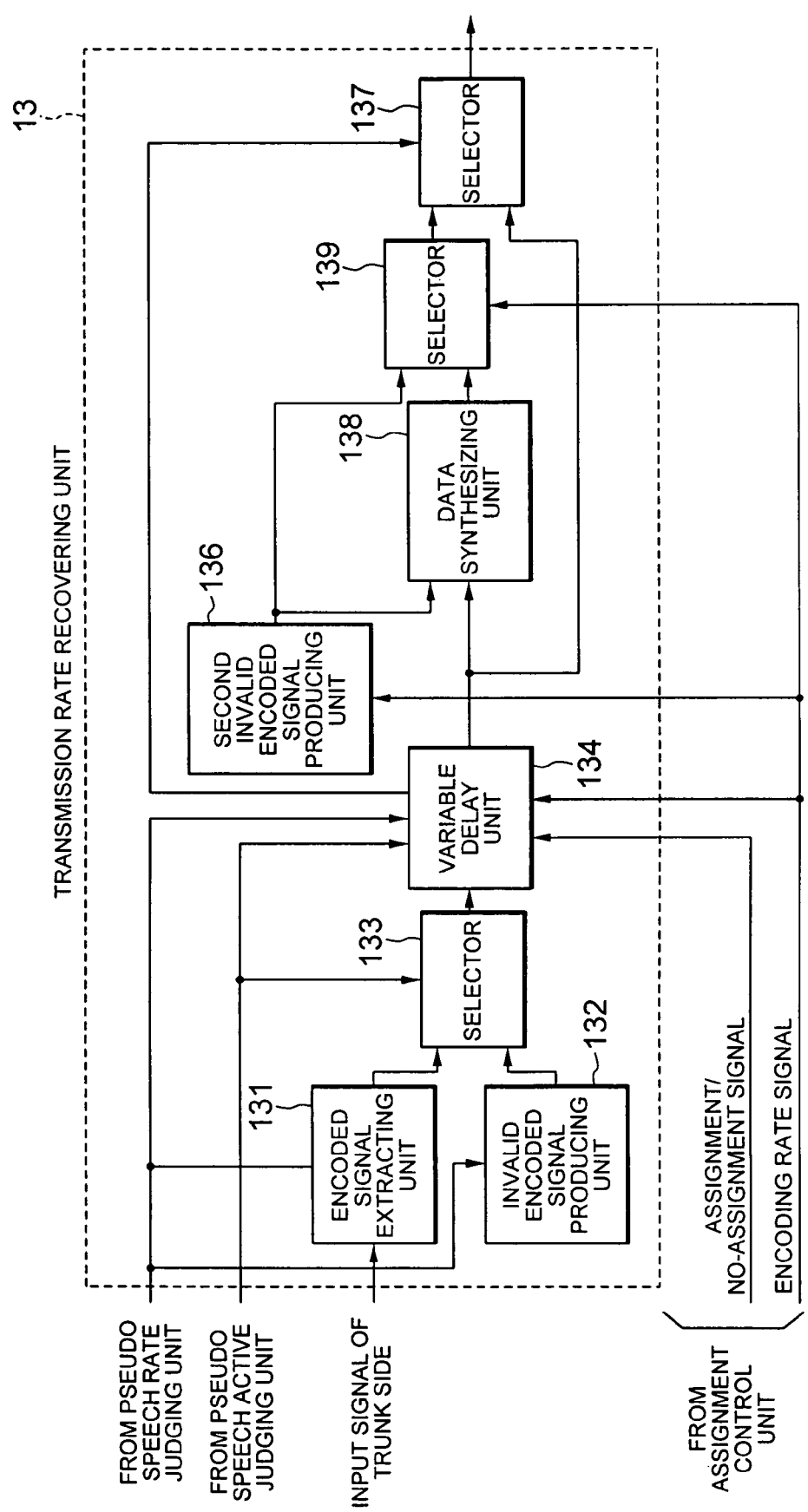
FIG. 14 is a schematic block diagram for indicating an internal arrangement of the transmission rate recovering unit 13 employed in a digital circuit multiplication equipment according to an embodiment mode 18 of the present invention.
Figure 15:
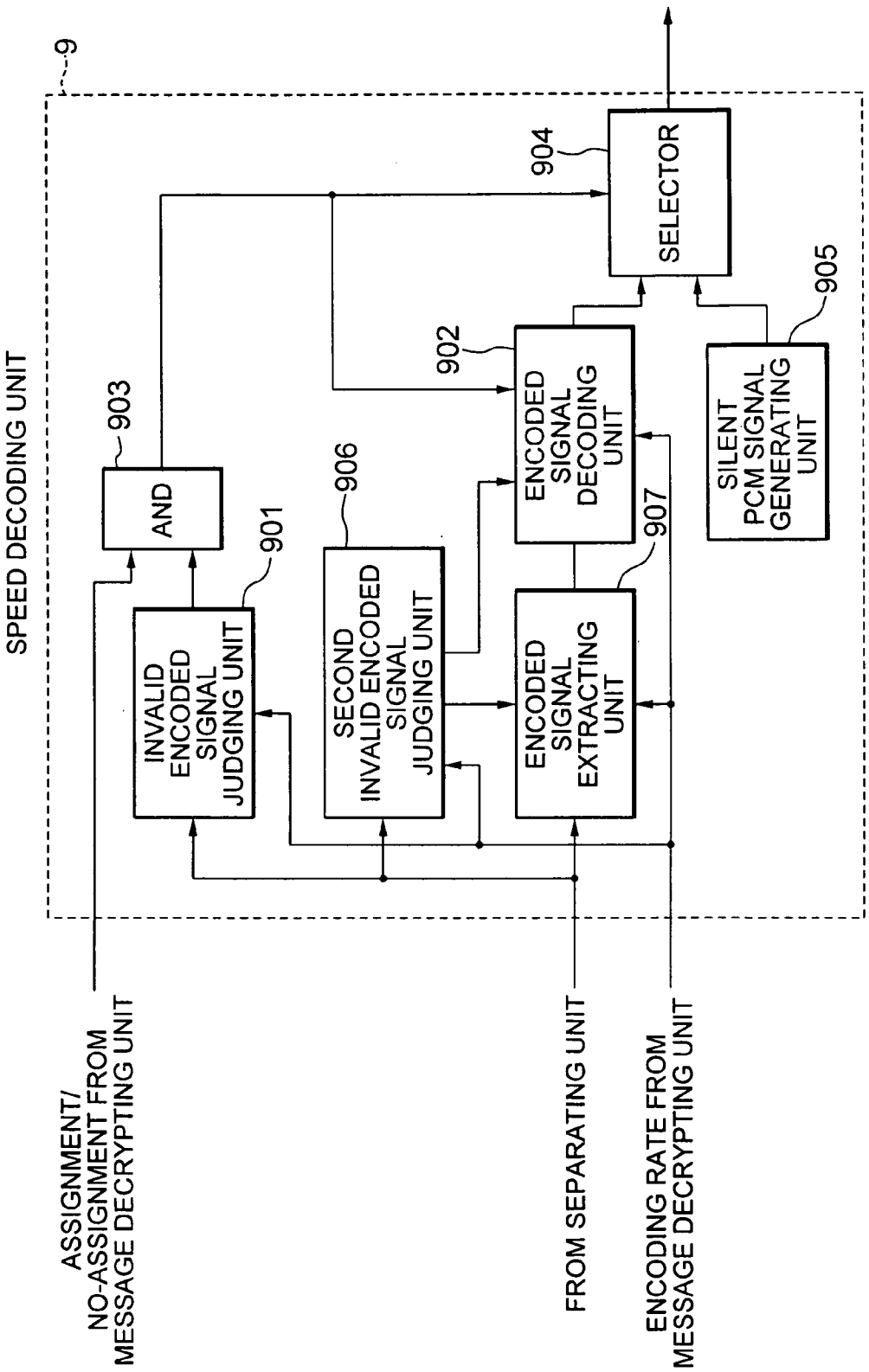
FIG. 15 is a schematic block diagram for showing an internal arrangement of the speech decoding unit 9 of the digital circuit multiplication equipment of the embodiment mode 18.

Alternatively, while the transmission rate recovering unit 13 may be arranged as shown in FIG. 14, the speech decoding unit 9 may be arranged as shown in FIG. 15.

In FIG. 14, reference numeral 137 indicates a data synthesizing unit, and reference number 138 represents a selector. Also, reference numeral 907 of FIG. 15 represents a encoded signal extracting unit.

A first description is made of operations of the transmission rate recovering unit 13 shown in FIG. 14.

The encoded signal extracting unit 131, the selector 133, and the selector 137 are operated in a similar manner to these of the relevant circuits employed in the transmission rate recovering unit 13 shown in FIG. 12. In response to rate information supplied from the pseudo speech rate judging unit 31, the invalid encoded signal producing unit 132 outputs either a first invalid encoded signal of 8 Kbit/s or a first invalid encoded signal of 40 Kbit/s. It should be understood that when the fist invalid encoded signal of 40 Kbit/s is outputted, such a pattern is used by which the signal of 32 Kbit/s can be discriminated from the signal of 40 Kbit/s. In other words, it is possible to discriminate the signal from the normal encoded signal, the first encoded signal, or the second encoded signal described below only by using 320 bits among 400 bits per DCME frame. As a consequence, while the second invalid encoded signal producing unit 136 outputs the second invalid encoded signal in response to the rate assignment information of the bearer circuit assignment from the assignment control unit 4, when the second invalid encoded signal of 40 Kbit/s is outputted, it is possible to discriminate as to whether or not the signal corresponds to the second invalid encoded signal only by using 320 bytes among 400 bits.

Based upon the bearer circuit assignment rate-entered from the assignment control unit 4, the selector 139 selects the second invalid encoding output signal from the second invalid encoded signal producing unit 136 when the assignment rate is 8 Kbit/s, and selects the output signal from the data-synthesizing unit 138 when the assignment rate is 40 Kbit/s. Then, this selector 139 outputs the selected signal to the selector 137. The data synthesizing unit 138 synthesizes the 8 Kbit/s encoded signal outputted from the variable DELAY unit 134 with the second invalid encoded signal of 40 Kbit/s outputted from the second invalid encoded signal producing unit 136 to supply the synthesized signal to the selector 139. As previously explained, since the second invalid encoded signal produced when the assignment rate is 40 Kbit/s can discriminate as to whether or not the signal corresponds to the second invalid encoded signal by using only 320 bits among all of 400 bits per 1 frame, the 80-bit encoded signal of 8 Kbit/s is added to this 320-bit signal so as to produce a signal of 400 bits from the data synthesizing unit 138.

Next, operations of the variable DELAY unit 134 will now be explained.

The variable DELAY unit 134 delays the signal entered from the selector 133 based upon the active/silence information entered from the pseudo speech active judging unit 28, the bearer circuit assignment/no-assignment information and the assignment rate information, which are entered from the assignment control unit 4, and also the encoding rate information entered from the pseudo speech rate judging unit 31. As a result, the encoded signals appeared just after this input signal is changed from the silent state into the active state (namely, input signal is changed from invalid encoded signal into normal encoded signal), and also just immediately after the encoding rate is changed can be firmly outputted to the bearer circuit.

First of all, the above-described variable DELAY unit 134 is operated in a similar manner to that of the transmission rate recovering unit 13 shown in FIG. 12 in such a case that there is no change in both the encoding rate information of the pseudo speech signal and also the bearer circuit assignment rate. In principle, the bearer circuit assignment rate is not changed unless the encoding rate of the pseudo speech signal is changed. In other words, when the input signal supplied from the pseudo speech active judging unit 28 is changed from the "silent" state into the "active" state, and at the same time, when the input signal supplied from the assignment control unit 4 is changed from the "no-assignment" state into the "assignment" state (namely, when bearer circuit assignment is not delayed), the variable DELAY unit 134 directly outputs the input signal derived from the selector 133.

On the other hand, when the input signal supplied from the pseudo speech active judging unit 28 is changed from the "silent" state into the "active" state, and at the same time, a delay is made in which the input signal supplied from the assignment-control unit 4 is changed from the "no-assignment" state into the "assignment" state (namely, when bearer circuit assignment is delayed), the variable DELAY unit 134 stores thereinto the encoded signals entered from the selector 133 until the assignment operation to the bearer circuit is carried out. While such encoded signals are stored, the variable DELAY unit 134 is continued to output the invalid encoded signals which have been outputted just before the signal storage operation. Then, when the assignment operation to the bearer circuit is commenced, the variable DELAY unit 134 outputs the stored encoded signals in the order of the signal storage operations.

In other words, this variable DELAY unit 134 delays the encoded signals by such a time period corresponding to delay of the assignment operation to the bearer circuit, and then outputs the delayed encoded signals.

In the case that the input signal from the pseudo speech active judging unit 28 is changed from the "active" state into the "silent" state, and thereafter the assignment operation to the bearer circuit is not performed, if the encoded signal has been delayed, then the variable DELAY unit 134 discards the encoded signals which have been delayed (or invalid encoded signals), and directly outputs the input signal supplied from the selector 133.

When the variable DELAY unit 134 is operated in accordance with the above-explained-operating manner, the encoded signals appeared just after the input signal is changed from the "silent" state into the "active" state can be firmly transmitted to the bearer circuit. In this case, as to the encoded signals appeared just after the input signal is changed from the "active" state into "silent" state, if the assignment operation of the bearer circuit is removed at the same time when this signal is changed from the "active" state to the "silent" state, then the encoded signals which have been delayed are not transmitted to the bearer circuit. It should also be noted that when there is no change in the encoding rate, as explained above, such a control signal of "0" is continuously outputted to the selector 137. As a consequence, the selector 137 continuously selects the output signal of the variable DELAY unit 134 to output this selected signal.

The following case will now be considered. That is, the encoding rate of the pseudo speech signal is changed. As a result, the assignment rate of the bearer circuit is changed (there is no possibility that this encoding rate information is not changed in case of "silent").

In such a case that both the encoding rate of the pseudo speech signal and the assignment rate of the bearer circuit are firstly changed at the same time (namely, bearer circuit assignment is not delayed), the variable DELAY unit 134 directly outputs the input signal entered from the selector 133 without delaying this input signal irrespective of such a fact as to whether or not the input signal entered from the selector 133 has been delayed in this variable DELAY unit 134. Then, a control signal outputted to the selector 137 is equal to "0" (namely, output of variable DELAY unit 134 is selected).

Also, another case is considered in which while the encoding rate of the pseudo speech signal is changed, the assignment rate of the bearer circuit is delayed. In this delay case, the operations of the variable DELAY unit 134 are performed in different manners when the assignment rate of the bearer circuit is changed from 40 Kbit/s to 8 Kbit/s, and conversely, when the assignment rate of the bearer circuit is changed from 8 Kbit/s to 40 Kbit/s.

First, when the bearer circuit assignment rate is changed from 8 Kbit/s to 40 Kbit/s, the operation of the variable DELAY unit 134 is carried out in a similar manner to that of the transmission rate recovering unit 13 shown in FIG. 12. Namely, until the assignment rate of the bearer circuit is changed, if such a encoded signal which has not yet been outputted before the encoding rate is changed is left in the variable DELAY unit 134, then this remaining encoded signal is outputted. If not, then while the control signal to be outputted to the selector 137 is set to "1", the output of the selector 139 is selected to be outputted.

It should be understood that at this time, since the bearer circuit assignment rate is equal to 8 Kbit/s, the selector 139 selects the second invalid encoded signal outputted from the second invalid encoded signal producing unit 136. Also, the variable DELAY unit 134 stores thereinto the input signal supplied from the selector 133. Thereafter, when the assignment rate of the bearer circuit is changed, the variable DELAY unit 134 returns the control signal outputted to the selector 137 to "0", and at the same time, sequentially outputs the encoded signals which have been inputted from the selector 133 to be stored thereinto from such a encoded signal appeared just after the encoding rate is changed. Then, if the encoded signals appeared before the encoding rate is changed, then the variable DELAY unit 134 discards all of these remaining encoded signals.

As previously explained, such a encoded signal appeared just after the encoding rate is changed from 8 Kbit/s to 40 Kbit/s may be firmly outputted to the bearer circuit. Conversely, in such a case that the encoding rate is changed from 40 Kbit/s into 8 Kbit/s, the variable DELAY unit 134 directly outputs the input signal (encoded signal of 8 Kbit/s) supplied from the selector 133 without delays even while the assignment rate of the bearer circuit is changed. It should also be noted that while the control signal to be outputted to the selector 137 is set to "1", the selector 137 accordingly selects the output signal of the selector 139 to output therefrom this selected signal.

Also, the 8 Kbit/s encoded signal outputted from this variable DELAY unit 134 is synthesized with the second invalid encoded signal by the data synthesizing unit 138, and then the synthesized signal is supplied to the selector 139. Furthermore, since the bearer circuit assignment rate is equal to 40 Kbit/s the selector 139 outputs such a input signal derived from the selector 139 to the selector 137. As a result, under this condition, the 40 Kbit/s signal outputted form the transmission rate recovering unit 13 constitutes such a signal produced by synthesizing the second invalid encoded signal with the 8 Kbit/s encoded signal. Thereafter, when the bearer circuit assignment rate of 40 Kbit/s is changed into 8 Kbit/s, the variable DELAY unit 134 returns the control signal outputted to the selector 137 to "0." As previously explained, in such a case that the encoding rate is changed from 40 Kbit/s to 8 Kbit/s, the 8 Kbit/s encoded signal appeared just after this encoding rate change is synthesized with the second invalid encoded signal to obtain the signal of 40 Kbit/s which will be then outputted to the bearer circuit.

Next, operation of the speech decoding unit 9 shown in FIG. 15 will now be explained. In FIG. 16, an invalid encoded signal judging unit 901, an AND gate circuit 903, a selector 904, and a silent PCM signal generating unit 905, and also a second invalid encoded signal judging circuit 906 are operated in a similar manner to those of the speech decoding unit 9 shown in FIG. 13. When the judgment result derived from the second invalid encoded signal judging unit 906 corresponds to the second invalid encoded signal, and encoding rate information derived from the message decrypting unit 8 corresponds to 40 Kbit/s, since the input signal from the separating unit 7 is equal to such a signal obtained by synthesizing the second invalid encoded signal with the 8 Kbit/s encoded signal, the encoded signal extracting unit 907 extracts only such an 8 Kbit/s encoded signal from this synthesized signal. Then, the encoded signal extracting unit 907 outputs the extracted 8 Kbit/s encoded signal to the encoded signal decoding unit 902. In other cases, the encoded signal extracting unit 907 directly outputs the input signal from the separating unit 7 to the encoded signal decoding unit 902.

The encoded signal decoding unit 902 decodes either the 8 Kbit/s encoded signal or the 40 Kbit/s encoded signal extracted from the encoded signal extracting unit 907 to obtain a PCM signal in accordance with the encoding rate information derived from the message decrypting unit 8. In such a case that even when the encoding rate information supplied from the message decrypting unit 8 is equal to 40 Kbit/s, if the judgment result entered from the second invalid encoded signal judging unit 906 is equal to the second invalid encoded signal, the encoded signal decoding unit 902 execute the speech encoding process operation for the 8 Kbit/s signal. Other internal parameter resetting operations are carried out in a similar manner to those of the encoded signal decoding unit 902 employed in the speech decoding unit 9 shown in FIG. 13.

As previously described, also, according to this embodiment mode 18, while the tandem pass-through operation is carried out, the speech coding device and the speech decoding device od DCME, which are located on both ends of the transmit path, can be reset in the synchronous resetting mode. Also, when the encoding rate is switched from 40 Kbit/s to 8 Kbit/s, even if the bearer circuit assignment operation is delayed, then a similar operation to that of such a case that substantially no assignment delay occurs can be achieved since the 8 Kbit/s encoded signal is embedded into the bearer circuit to which the 40 Kbit/s decoded signal is assigned, and then the embedded encoded signal is transmitted.

As previously described in detail, in accordance with the present invention, in the digital circuit multiplication equipment equipped with the tandem pass-through function, such a digital circuit multiplication equipment capable of resetting both the speech coding device and the speech decoding device in the synchronous resetting mode can be obtained.

What is claimed is:

1. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:
means for transmitting number of a trunk channel operated under pass-through operation to the another digital circuit multiplication equipment connected via a bearer circuit;
means for continuously assigning the bearer circuit with respect to the trunk channel operated under pass-through operation;
means for embedding information indicative of a encoding rate of a encoded speech signal from the bearer circuit into the signal which is outputted with respect to the trunk channel operated under pass-through operation;

means for detecting the information indicative of said encoding rate from an input signal of the trunk channel operated under pass-through operation;

means for determining an assignment of said trunk channel to the bearer circuit by using said encoding rate detected from the input signal of the trunk channel operated under pass-through operation; and means for delaying the encoded speech signal contained in the input signal of the trunk channel in such a case that when the encoding rate of the encoded speech signal contained in the input signal of the trunk channel operated under pass-through operation is transmitted, the assignment rate change of said trunk channel to the bearer circuit is delayed, and for starting to output the delayed encoded speech signal after the bearer circuit has been assigned.

2. A digital circuit multiplication equipment as claimed in claim 1, wherein:

said digital circuit multiplication equipment is further comprised of:

means for outputting a second invalid encoded signal to the bearer circuit until the assignment rate to the bearer circuit is changed, said second invalid encoded signal indicating that said invalid encoded signal is an invalid encoded speech signal, in such a case that when the encoding rate of the encoded speech signal contained in the input signal of the trunk channel operated under pass-through operation is transmitted, the assignment rate change of said trunk channel to the bearer circuit is delayed;

a speech-decoding device for outputting only a signal different from both a first invalid encoded signal and said second invalid encoded signal; and means for outputting a silent PCM signal in the case that said first invalid encoded signal is entered from the bearer circuit, and also for outputting a prediction PCM signal for predicting a PCM signal which should be subsequently outputted in such a case that said second invalid encoded signal is inputted.

3. A digital circuit multiplication equipment as claimed in claim 2, wherein:

when a speech encoding system corresponds to the ADPCM system defined in the ITU-T recommendation G.726, and wherein a encoded speech signal which is not defined by said ITU-T recommendation and contains such encodes, all of which for 1 sample are equal to "1", is used as said second invalid encoded signal.

4. A digital circuit multiplication equipment as claimed in claim 2, wherein:

when a speech encoding system corresponds to the CELP system, and wherein a encoded speech signal containing a vector is used as said second invalid encoded signal, the use frequency of which vector being low when a speech signal is inputted into the encoding device.

5. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:

means for embedding information into the signal which is outputted using the trunk channel under pass-through operation, said information indicating as to whether or not a encoded speech signal derived from a bearer circuit is present;

means for detecting from an input signal of the trunk channel operated under pass-through operation, information indicating as to whether or not said encoded speech signal derived from said bearer circuit is present;

means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation;

a speech decoding device for outputting only a signal different from said first invalid encoded signal;

means for outputting a silent PCM signal in the trunk channel which receives said first invalid encoded signal from the bearer circuits;

means for determining an assignment of the trunk channel operated under pass-through operation to the bearer circuit by employing such information for indicating as to whether or not the encoded speech signal derived from the bearer circuit is present in the input signal of the trunk channel; and means for delaying the encoded signal contained in the input signal of the trunk channel in such a case that when a state under which the encoded speech signal is not present from the bearer circuit contained in the input signal of the trunk channel operated under pass-through operation is transmitted to another state under which the encoded speech signal is present, the assignment of said trunk channel to the bearer circuit is delayed, and for starting to output said delayed encoded signal after the trunk channel has been assigned to the bearer circuit.

6. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:

means for embedding information into the signal which is outputted using the trunk channel under pass-through operation, said information indicating as to whether or not a encoded speech signal derived from a bearer circuit is present;

means for detecting from an input signal of the trunk channel operated under pass-through operation, information indicating as to whether or not said encoded speech signal derived from said bearer circuit is present;

means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation;

a speech decoding device for outputting only a signal different from said first invalid encoded signal;

means for outputting a silent PCM signal in the trunk channel which receives said first invalid encoded signal from the bearer circuit;

means for outputting encoded speech signals which correspond to plural frames and have been inputted from the bearer circuit in the past with respect to the trunk channel operated under pass-through operation;

means for extracting said encoded speech signal corresponding to the plural frames from the input signal of the trunk channel operated under pass-through operation; and means for outputting old encoded speech signals by the delayed assignment number from the encoded speech signals corresponding to the plural frames, which are extracted from the input signal of said trunk channel in such a case that when a state under which the encoded speech signal is not present from the bearer circuit contained in the input signal of the trunk channel operated under pass-through operation is transmitted to another state under which the encoded speech signal is present, the assignment of said trunk channel to the bearer circuit is delayed, and for starting to output a delayed encoded speech signal after the trunk channel has been assigned to the bearer circuit.

7. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:

means for embedding information into the signal which is outputted using the trunk channel under pass-through operation, said information indicating as to whether or not a encoded speech signal derived from a bearer circuit is present;

means for detecting from an input signal of the trunk channel operated under pass-through operation, information indicating as to whether or not said encoded speech signal derived from said bearer circuit is present;

means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation;

a speech decoding device for outputting only a signal different from said first invalid encoded signal;

means for outputting a silent PCM signal in the trunk channel which receives said first invalid encoded signal from the bearer circuit;

means for embedding information indicative of a encoding rate of a encoded speech signal from the bearer circuit into the signal which is outputted with respect to the trunk channel operated under pass-through operation;

means for detecting the information indicative of said encoding rate from the input signal of the trunk channel operated under pass-through operation;

means for determining an assignment of said trunk channel to the bearer circuit by using said encoding rate detected from the input signal of the trunk channel operated under pass-through operation;

means for delaying the encoded speech signal contained in the input signal of the trunk channel in such a case that when the encoding rate of the encoded speech signal contained in the input signal of the trunk channel operated under pass-through operation, is transmitted from a high rate to a low rate, the assignment rate change of said trunk channel to the bearer circuit is delayed, and for starting to output the delayed encoded speech signal after the bearer circuit has been assigned;

means for outputting a second invalid encoded signal to the bearer circuit until the assignment rate to the bearer circuit is changed, said second invalid encoded signal indicating that said second invalid encoded signal is an invalid encoded speech signal, in such a case that when the encoding rate of the encoded speech signal contained in the input signal of the trunk channel operated under pass-through operation is transmitted from the high rate to the low rate, the assignment rate change of said trunk channel to the bearer circuit is delayed;

means for synthesizing the encoded speech signal contained in the input signal of said trunk channel with such information for indicating such a fact that the encoded speech signal of the low encoding rate is contained in the case that when the encoding rate of the encoded speech signal contained in the input signal of the trunk channel operated under pass-through operation, the assignment rate change of said trunk channel to the bearer circuit is delayed, and then for outputting the synthesized encoded speech signal to the bearer circuit;

a speech decoding device for outputting only such a signal different from both said first invalid encoded signal and said second invalid encoded signal; and means for outputting a silent PCM signal in the case that said first invalid encoded signal is entered from the bearer circuit, and for outputting a prediction PCM signal for predicting a PCM signal which would be subsequently outputted in such a case that said second invalid encoded signal is inputted; and further for extracting the encoded signal of the low rate to be decoded into the PCM signal in the input case that such a signal is inputted in which said encoded signal of the low rate is synthesized with the information for indicating that the encoded signal of the low rate is contained.

8. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:

means for embedding information into the signal which is outputted using the trunk channel under pass-through operation, said information indicating as to whether or not a encoded speech signal derived from a bearer circuit is present;

means for detecting from an input signal of the trunk channel operated under pass-through operation, information indicating as to whether or not said encoded speech signal derived from said bearer circuit is present;

means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation;

a speech decoding device for outputting only a signal different from said first invalid encoded signal;

means for outputting a silent PCM signal in the trunk channel which receives said first invalid encoded signal from the bearer circuit;

wherein when a speech encoding system corresponds to the ADPCM system defined in the ITU-T recommendation G.726, and wherein a encoded speech signal which is not defined by said ITU-T recommendation and contains such encodes, all of which for 1 sample are equal to "1", is used as said first invalid encoded signal.

9. In a digital circuit multiplication equipment equipped with a tandem pass-through function capable of pass-through transmitting a signal, using a trunk channel, connected via an exchange to another digital circuit multiplication equipment, the digital circuit multiplication equipment comprising:

means for embedding information into the signal which is outputted using the trunk channel under pass-through operation, said information indicating as to whether or not a encoded speech signal derived from a bearer circuit is present;

means for detecting from an input signal of the trunk channel operated under pass-through operation, information indicating as to whether or not said encoded speech signal derived from said bearer circuit is present;

means for outputting a first invalid encoded signal indicative of being equal to an invalid encoded signal with respect to the bearer circuit in such a case that the encoded speech signal derived from the bearer circuit is not contained in the input signal of the trunk channel operated under the pass-through operation;

a speech decoding device for outputting only a signal different from said first invalid encoded signal; means for outputting a silent PCM signal in the trunk channel which receives said first invalid encoded signal from the bearer circuit;

wherein, when a speech encoding system corresponds to the CELP system, a encoded speech signal containing a vector is used as said first invalid encoded signal, the use frequency of which vector being low when a speech signal is inputted into the encoding device.

* * * * *